United States Patent
Mayol Cuevas et al.

(10) Patent No.: US 12,498,846 B1
(45) Date of Patent: Dec. 16, 2025

(54) COMPUTER-GUIDED ITEM CREATION AND INTERACTION

(71) Applicant: Amazon Technologies, Inc., Seattle, WA (US)

(72) Inventors: Walterio Wolfgang Mayol Cuevas, Seattle, WA (US); Glenn Andrew Dyck, Seattle, WA (US); Gordon Mueller, Poulsbo, WA (US); Monica Jean Parsons, Seattle, WA (US); Nataliya Shapovalova, Sammamish, WA (US); Sarah Maurine Role Schaffer, Seattle, WA (US); Lorien S Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 17/953,561

(22) Filed: Sep. 27, 2022

(51) Int. Cl.
| | |
|---|---|
| G06F 3/04842 | (2022.01) |
| G06F 3/14 | (2006.01) |
| G09G 3/00 | (2006.01) |
| H04L 65/1069 | (2022.01) |

(52) U.S. Cl.
CPC ........ G06F 3/04842 (2013.01); G06F 3/1454 (2013.01); G09G 3/002 (2013.01); H04L 65/1069 (2013.01); G06F 2218/02 (2023.01); G09G 2354/00 (2013.01)

(58) Field of Classification Search
None
See application file for complete search history.

(56) References Cited

U.S. PATENT DOCUMENTS

| | | | |
|---|---|---|---|
| 8,388,139 B2 * | 3/2013 | LaDuke | G03B 21/14 353/121 |
| 10,498,401 B1 * | 12/2019 | Rule | H04B 5/77 |
| 2017/0110026 A1 * | 4/2017 | Liu | G09B 19/0038 |
| 2017/0177746 A1 * | 6/2017 | Gotou | G06F 30/00 |
| 2018/0357472 A1 * | 12/2018 | Dreessen | G06V 20/49 |
| 2019/0096135 A1 * | 3/2019 | Dal Mutto | G06F 18/24765 |
| 2019/0156472 A1 * | 5/2019 | Link | G06T 7/001 |

(Continued)

FOREIGN PATENT DOCUMENTS

| | | | | |
|---|---|---|---|---|
| WO | WO-2019111027 A1 * | 6/2019 | | G06F 3/011 |

OTHER PUBLICATIONS

Bagamaspad et al., A Mobile Augmented Reality-Based Assembly Guidance Application for Lego, Jul. 2018, iadis digital library, pp. 237-244 (Year: 2018).*

(Continued)

*Primary Examiner* — Andrew G Yang
(74) *Attorney, Agent, or Firm* — Eversheds Sutherland (US) LLP

(57) ABSTRACT

Systems and methods for computer-guided item creation and interaction include causing display of item creation templates and directions for creating an item from an object. Image data and infrared data is collected and utilized during item creation to determine user movement deviations and object shape deviations from the directions to provide real time corrective guidance and to determine how to augment the templates and/or directions. Once created, the item is analyzed to determine differences between it and a reference item such that displayed content is augmented when the created item is interacting with a surface.

20 Claims, 15 Drawing Sheets

(56) References Cited

U.S. PATENT DOCUMENTS

| | | | |
|---|---|---|---|
| 2019/0253614 A1* | 8/2019 | Oleson | H04N 23/62 |
| 2020/0118339 A1* | 4/2020 | Sakai | G06T 19/20 |
| 2022/0073280 A1* | 3/2022 | Gentilini | B65G 1/1375 |
| 2022/0237762 A1* | 7/2022 | Antonis | G06T 7/001 |
| 2022/0272314 A1* | 8/2022 | Rueb | G01C 11/025 |
| 2022/0404819 A1* | 12/2022 | Ba | G05B 19/41875 |
| 2023/0014774 A1* | 1/2023 | Shin | G06T 19/00 |
| 2023/0143785 A1* | 5/2023 | Rakshit | G09G 5/14 |
| | | | 726/26 |

OTHER PUBLICATIONS

Gupta et al., DuploTrack: a real-time system for authoring and guiding duplo block assembly, Oct. 2012, ACM, pp. 389-402 (Year: 2012).*

* cited by examiner

COMPUTER-GUIDED ITEM CREATION AND INTERACTION

BACKGROUND

Templates exist for the creation of items. Instructions may also be presented to a user to assist in creating items and interacting with those items. Described herein are improvements in technology and solutions to technical problems that can be used to, among other things, enhance item creation and interaction.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
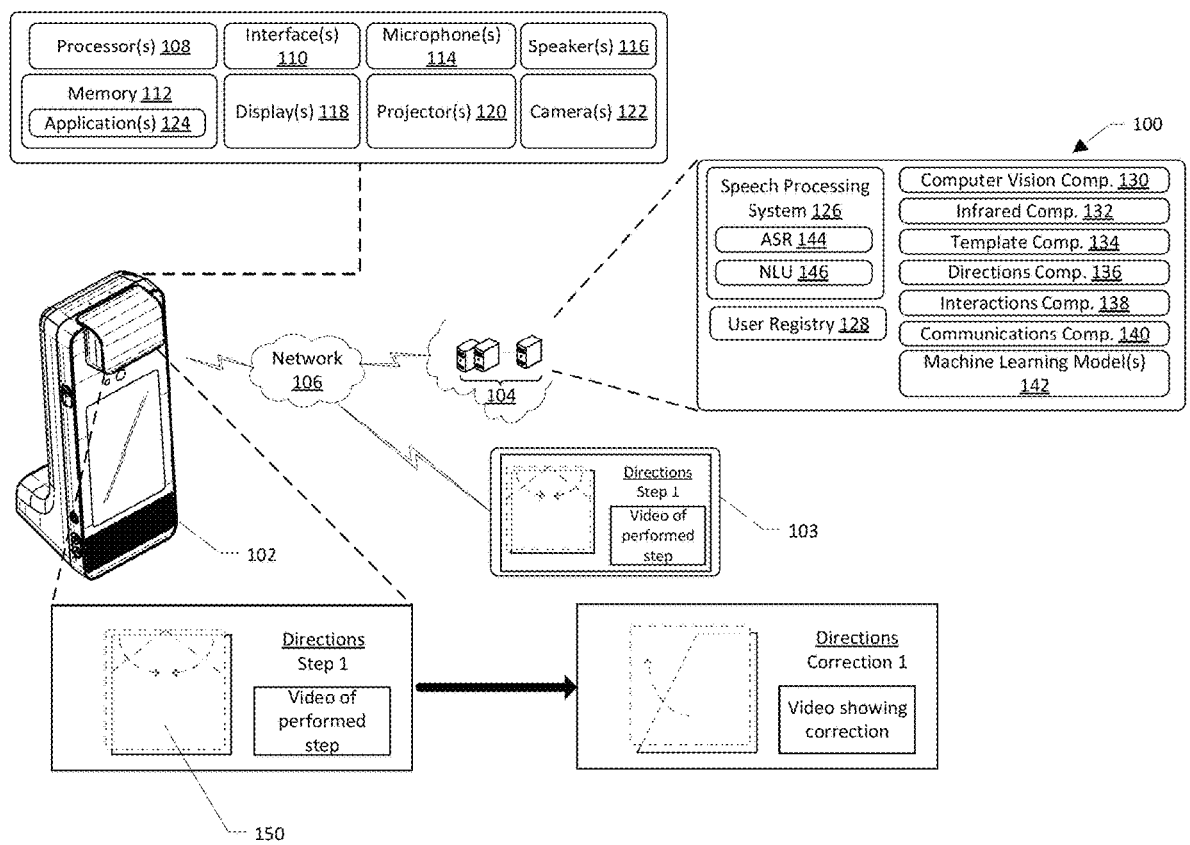
FIG. 1 illustrates a schematic diagram of an example environment for computer-guided item creation and interaction.

Systems and methods for computer-guided item creation and interaction are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. In examples, the electronic devices may include a projector that may be configured to project images onto a surface adjacent to the electronic devices and/or may include a screen that may be configured to display images of a surface adjacent to the electronic devices. The electronic devices may include one or more other components, such as processors, memory, interfaces, displays, cameras, microphones, and/or speakers.

Generally, crafts and other items may be created from a number of object types, including, for example, paper, clay, sticks, etc. As used herein, "objects" are described as the starting material for making items, and "items" are described as what is created from the starting materials. Typically, creating items such as these is performed utilizing a set of instructions and perhaps a video of a person demonstrating how to create a given item from a given object. However, it would be helpful if dynamic feedback were provided to the user creating the item to aid in, among other things, determining if the instructions are being followed consistently, determining whether to move on to a next step in the instructions, and/or determining what to do if an error occurs during creation of the item. In addition to these item-creation benefits it would be beneficial to dynamically determine deviations between a created item and the item if perfectly created pursuant to the directions. Doing so would assist in accurately tracking the created item and its components during interaction with a device. Accurate item tracking may assist in accurately displaying content in association with the created item.

To achieve these and other benefits, a device may include a projector that is configured to project light onto a surface adjacent to the device. In other examples, the device may include a screen that displays images of the surface. A user may select an item to be created by providing user input data indicating that selection to the user device and/or to another device such as a voice interface device associated with the user device. In still other examples, a communication session may be established between the user device and a remote device, and that remote device may provide the user input data selecting the item to be created. Once the item to be created is selected, a template component may be queried for data representing an interactive template for creating the item from an object. The interactive template may be at least partially in the form of image data that the user device may utilize to project corresponding images onto the surface adjacent to the user device and/or to display such images on a screen. For example, say the item to be created is a paper airplane. The interactive template for this item may be a series of images that start as a representation of a flat piece of paper with indicators of where and how to fold the flat piece of paper to create the paper airplane or other origami item. When this item-creation process is initiated with the user device, the interactive template may be displayed on a first portion of the surface by the projector of the user device and/or on a screen. Then, the user of the user device may place an object (e.g., a piece of paper, building block, household object, etc.) on the first portion of the surface where the interactive template is displayed. At this point, a camera of the user device may capture images of the first portion of the surface, including the object as placed by the user, and corresponding image data may be sent to a computer vision component for processing. The computer vision component may utilize the image data to identify the object and the object's size. This object sizing data may then be utilized by the template component to determine how the template should be augmented, if at all, so that the template is similarly sized to the object placed on the surface. For example, the template may start as a 8.5 by 11 inch representation of a piece of paper, but the object placed on the surface may be a 8 by 10 inch piece of paper. The computer vision component and the template component may be utilized to resize the representation of the piece of paper to comport with the 8 by 10 inch piece of paper.

In addition to the interactive template being displayed on the first portion of the surface, directions for performing steps to create the item from the object may be displayed on a second portion of the surface. The directions may include text that the user of the device can read to assist in creating the item, audio the user can hear (e.g., text-to-speech using an artificial voice, like Amazon Alexa), and/or the directions may include images and/or videos of other users performing the steps that correspond to the directions, for example. Utilizing the interactive template and/or the directions, the user may manipulate the object to start creating the item. As the user moves the user's hands within a field of view of the camera of the device, and as the object is reshaped by the user, image data may continue to be generated by the camera of the device. This image data may be utilized by the computer vision component to determine how the user is moving and/or how the object is being reshaped. Additional details on computer vision processing are provided below, but generally the computer vision component may utilize the image data to determine what portions of the object are being manipulated by the user, how those portions are being manipulated, and what shape the object is taking as the object is manipulated by the user. In addition to data generated by the computer vision component, an infrared component of the system may be utilized to generate infrared data associated with the surface where the interactive template is being displayed. For example, infrared light may be emitted onto the surface where the template is displayed. When an object such as the piece of paper and/or a portion of a person such as a hand moves into the area where the infrared light is being emitted, the infrared light may be affected by that object and/or portion of a person's body. Data indicating these infrared light effects may be generated and utilized by the infrared component to determine object location and hand location over time. This information may be utilized by the template component to determine movement of objects and user implements over time.

This infrared data and visual image data can be processed by computer vision functionality may be utilized by the template component to determine degrees of deviation between reference movements associated with the directions to create the item and the user's movements, and between reference shapes associated with the item if created pursuant to the directions and the item as currently being created by the user. These degrees of deviation may indicate that the user is or is not manipulating the intended portion of the object for a given step in the directions, that the user is or is not performing the steps in a predefined range of time, that the user has manipulated the shape of the object within a threshold range that is acceptable for the given step of the directions, and/or that the item being created is otherwise being created consistent with the directions.

When the degrees of deviation satisfy certain thresholds indicating that the item is being created inconsistently with the directions, the system may perform a number of actions. Once such action may be to notify the user of the device that there has been deviation. Additionally or alternatively, an action may include recommending corrective actions to take (e.g., specific to the particular deviations identified by computer vision). These corrective actions may include augmenting the template as displayed to show how the user should manipulate the object to be more consistent with the intended objective of the directions. The corrective actions may also include augmenting the directions to describe and/or show more nuanced information and/or slower presentation of the prior information. In these examples, a database of previously-identified deviations for creating the item in question may be maintained, and the visual image data and infrared data may be utilized to determine which of the previously-identified deviations most closely resembles the shape of the item made by the user. The database may include templates, directions, and/or other data that may be selected to be presented to the user to correct the error made while creating the item.

In still other examples, particularly where a communication session with a remote device is established while item creation is taking place, an indication of the deviation(s) may be provided to the remote device along with recommendations for taking corrective action. In this example, the remote user may provide user input data that may be sent to the user device to assist with performing a corrective action. For example, the user of the user device may be a child and the user of the remote device may be an adult helping the child create the item. In this example, presenting the corrective actions to the child may not allow the child, in certain circumstances, to understand and utilize those corrective actions to fix the item. However, presenting such corrective actions and indications of deviations to the adult using the remote device may allow that adult to provide user input such as user utterances, touch input on the remote device, and/or selection of corrective actions to assist the child in performing the corrective actions. By so doing, the user device and the remote device may share data such that actions performed in association with the user device are synchronized with display of those actions on the remote device, and vice versa. This may allow the remote user to see the surface, the templates, the directions, and/or any other information that is being utilized in association with the user device. This may also allow representations of user input received at the remote device to be displayed using the user device, such as a representation of the remote user making notes, pointing to objects, providing praise, etc.

Additionally, once the item is created, the user device may then be utilized to interact with the created item. For example, games, lessons, augmented reality, and/or other applications may be initiated and may allow for content displayed on the surface to interact with the created item. An example of this may be that ripples of water are projected onto the surface and/or are displayed on a screen when the created item, such as a paper fish, is moved across the surface. To accurately display such content when the item is moved or otherwise utilized on the surface, image data of the created item may first be utilized by the computer vision component to determine the shape and other attributes of the item as created. This data may be utilized by an interaction component to determine deviations between item attributes of the created item and attributes of a reference item as if the item were created accurately using the directions. These deviations may include, for example, sizing differences between the created item and the reference item, color differences, components in different places, presence of extra components, etc.

The interactions component may utilize these deviations to correlate which portions of the created item correspond to given portions of the reference item and may generate data indicating these correlations. Then, when the created item is detected on the surface, the correlation data may be utilized to change the way content is displayed. For the example, the created item may be a toy rocket made of paper with a nose section, a tail section, and a door. A game application associated with the toy rocket may include the display of content on the surface adjacent to the user device in a manner where the content appears to be displayed on and/or around the rocket. Such content may include a depiction of outer space, stars, ignition flames coming from the tail portion of the rocket as if flying, etc. However, to accurately determine where on the surface to display this content, the locations of portions of the created item may be determined (e.g., accurately determining where the tail section of the toy rocket is allows for accurately displaying representations of ignition flames near that portion). The data representing differences between attributes of the created item and attributes of the reference item may be utilized to accurately determine locations of the portions of the item. For example, this data may indicate, in the toy rocket example, that a nose portion is slightly bent, that the door has been placed on a different portion of the rocket than instructed, that the tail portion is partially missing, etc. The interactions component can utilize these determined differences to augment how the content is displayed in relation to the created item such that even when the item is not created perfectly, it can still be utilized to interact with displayed content in an accurate manner.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for computer-guided item creation and interaction. The system 100 may include, for example, one or more devices 102. In certain examples, the devices 102 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. In examples, the electronic devices 102 may include a touch-sensitive surface, which may be any device that includes capacitive sensing capabilities and may include one or more other components, such as processors, memory, interfaces, displays, cameras, microphones, and/or speakers. The electronic devices 102 may also be described herein as "user devices" 102. In addition to these devices 102 that have projectors, the system 100 may include a remote device 103. The remote device 103 may include some or all of the same components as the user devices 102, but may be remote from the user devices 102. The devices 102, 103 may be configured to send data to and/or receive data from a system 104, such as via a network 106. It should be understood that where operations are described herein as being performed by the system 104, some or all of those operations may be performed by the devices 102, 103. It should also be understood that anytime the system 104 is referenced, that system may include any system and/or device, whether local to an environment of the devices 102, 103 or otherwise, unless specifically noted to be local and/or remote in a given example. Additionally, it should be understood that a given space and/or environment may include numerous devices 102, 103. It should also be understood that when a "space" or "environment" is used herein, those terms mean an area and not necessarily a given room, building, or other structure, unless otherwise specifically described as such.

The user devices 102 may include one or more components, such as, for example, one or more processors 108, one or more network interfaces 110, memory 112, one or more microphones 114, one or more speakers 116, one or more displays 118, one or more projectors 120, and/or one or more cameras 122. The microphones 114 may be configured to capture audio, such as user utterances, and generate corresponding audio data. The speakers 116 may be configured to output audio, such as audio corresponding to audio data received from another device and/or the system 104. The displays 118 may be configured to present images, such as images corresponding to image data received from another device and/or the system 104. The one or more projectors 120 may be configured to project images and/or light, such as onto a surface adjacent to the device 102. The one or more cameras 122 may be configured to capture images, such as images of the surface and/or objects within a field of view of the cameras 122. The memory 112 may include components such as, for example, one or more applications 124. Each of these components of the memory 112 will be described in detail below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 126, a user registry 128, a computer vision component 130, an infrared component 132, a template component 134, a directions components 136, an interactions component 138, a communications component 140, and/or one or more machine learning models 142. It should be understood that while the components of the system 104 are depicted and/or described as separate from each other in FIG. 1, some or all of the components may be a part of the same system. The speech processing system 126 may include an automatic speech recognition component (ASR) 144 and/or a natural language understanding component (NLU) 146. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with connected devices and may have been developed specifically to work in connection with given connected devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102 and the system 104 are described in detail below. In examples, some or each of the components of the system 104 may include their own processor(s), network interface(s), and/or memory. As such, by way of example, the speech processing system 126 may include and/or be associated with processor(s), network interface(s), and/or memory. The other components of the system 104, such as the template component 134, may include and/or be associated with different processor(s), network interface(s), and/or memory, or one or more of these components may utilize some or all of the same processor(s), network interface(s), and/or memory utilized by the speech processing system 126. These components are described in detail below. Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 128 may be configured to determine and/or generate associations between users, user accounts, environment identifiers, and/or devices. For example, one or more associations between user accounts may be identified, determined, and/or generated by the user registry 128. The user registry 128 may additionally store information indicating one or more applications and/or resources accessible to and/or enabled for a given user account. Additionally, the user registry 128 may include information indicating device identifiers, such as naming identifiers, associated with a given user account, as well as device types associated with the device identifiers. The user registry 128 may also include information indicating user account identifiers, naming indicators of devices associated with user accounts, and/or associations between devices, such as the devices 102. The user registry 128 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. As described herein, the user registry 128 may be considered a registry of devices for given account data.

The speech-processing system 126 may be configured to receive audio data from the devices 102 and/or other devices and perform speech-processing operations. For example, the ASR component 144 may be configured to generate text data corresponding to the audio data, and the NLU component 146 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "let's build a paper airplane," the NLU component 146 may identify a "build" intent and the payload may be "paper airplane." In this example where the intent data indicates an intent to initiate an application for guiding a user through creating a paper airplane, the speech processing system 126 may call one or more speechlets to effectuate the intent. Speechlets, as described herein may otherwise be described as applications and may include functionality for utilizing intent data to generate directives and/or instructions. For example, an application associated with creating items from objects may be called. The application may be designated as being configured to handle the intent of assisting a user in creating items from objects, for example. The application may receive the intent data and/or other data associated with the user utterance from the NLU component 146, such as by an orchestrator of the system 104, and may perform operations to initiate display of templates for creating a paper airplane, for example. The system 104 may generate audio data confirming that the item-creation application has been started, such as by a text-to-speech component. The audio data may be sent from the system 104 to one or more of the devices 102.

The components of the system 100 are described below by way of example. For example, a user may select an item to be created by providing user input data indicating that selection to the user device 102 and/or to another device such as a voice interface device associated with the user device 102. In still other examples, the communications component 140 may determine that a communication session may be established between the user device 102 and the remote device 103, and the remote device 103 may provide the user input data selecting the item to be created. Once the item to be created is selected, the template component 134 may be queried for data representing an interactive template 150 for creating the item from an object. The interactive template 150 may be at least partially in the form of image data that the user device 102 may utilize to project corresponding images onto the surface adjacent to the user device 102 and/or to display images on the display 118. For example, say the item to be created is a paper airplane. The interactive template 150 for this item may be a series of images that start as a representation of a flat piece of paper with indicators of where and how to fold the flat piece of paper to create the paper airplane. When this item-creation process is initiated with the user device 102, the interactive template 150 may be displayed on a first portion of the surface by the projector 120 of the user device 102. Then, the user of the user device 102 may place an object (e.g., a piece of paper) on the first portion of the surface where the interactive template 150 is displayed. At this point, the camera 122 of the user device 102 may capture images of the first portion of the surface, including the object as placed by the user, and corresponding image data may be sent to the computer vision component 130 for processing. The computer vision component 130 may utilize the image data to identify the object and the object's size. This object sizing data may then be utilized by the template component 134 to determine how the template 150 should be augmented, if at all, so that the template is similarly sized to the object placed on the surface. For example, the template 150 may start as a 8.5 by 11 inch representation of a piece of paper, but the object placed on the surface may be a 8 by 10 inch piece of paper. The computer vision component 130 and the template component 134 may be utilized to resize the representation of the piece of paper to comport with the 8 by 10 inch piece of paper.

In addition to the interactive template 150 being displayed on the first portion of the surface, directions for performing steps to create the item from the object may be displayed on a second portion of the surface utilizing the directions component 136. The directions may include text that the user of the user device 102 can read to assist in creating the item, and/or the directions may include images and/or videos of other users performing the steps that correspond to the directions, for example. Utilizing the interactive template 150 and/or the directions, the user may manipulate the object to start creating the item. As the user moves the user's hands within a field of view of the camera 122 of the user device 102, and as the object is reshaped by the user, image data may continue to be generated by the camera 122 of the user device 102. This image data may be utilized by the computer vision component 130 to determine how the user is moving and/or how the object is being reshaped. Generally the computer vision component 130 may utilize the image data to determine what portions of the object are being manipulated by the user, how those portions are being manipulated, and what shape the object is taking as the object is manipulated by the user.

When computer vision techniques are utilized as described herein, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, and/or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to ensure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: lines, edges, and ridges; localized interest points such as corners, blobs, or points; and/or features related to texture, shape, or motion. At some point in the processing a decision may be made about which image points or regions of the image are relevant for further processing. Examples include: selection of a specific set of interest points; segmentation of one or multiple image regions that contain a specific object of interest; and/or segmentation of the image into nested scene architecture comprising a foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classification of a detected object into different categories; and/or comparing and combining two different views of the same object. Making the final decision required for the application, for example match/no-match in recognition applications, may then be performed.

In addition to data generated by the computer vision component 130, the infrared component 132 may be utilized to generate infrared data associated with the surface where the interactive template 150 is being displayed. For example, infrared light may be emitted onto the surface where the template 150 is displayed. When an object such as the piece of paper and/or a portion of a person such as a hand moves into the area where the infrared light is being emitted, the infrared light may be affected by that object and/or portion of a person's body. Data indicating these infrared light effects may be generated and utilized by the infrared component 132 to determine object location and hand location over time. This information may be utilized by the template component 134 to determine movement of objects and user implements over time.

It should be understood that while image data from a camera and infrared data are described herein by way of example as signals that may be utilized to determine item creation progress and item interaction attributes, additional and/or different signals may also be utilized. Example signals include, not by way of limitation, millimeter wave signals, radar signals, sonar signals from one or more sonar sensors, Lidar signals, radio-frequency identification signals, audio signals, capacitive touch signals, resistive touch signals, etc. Some or all of these signals may be utilized to determine item creation progress and item interaction attributes, including by utilizing machine learning models 142 with these signals as input to such models 142.

This infrared data and visual image data may be utilized by the template component 134 to determine degrees of deviation between reference movements associated with the directions to create the item and the user's movements when creating the item, as well as degrees of deviation between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created consistently or inconsistently with respect to the directions.

When the degrees of deviation satisfy certain thresholds indicating that the item is being created inconsistently, the system may perform a number of actions. These thresholds may be specific to the deviation at issue and/or to the item being created. For example, if the deviation is associated with a color of the item, where the instructed color is dark red but the color used to create the item is light red, such a deviation may not merit corrective action and/or may merit a recommendation for correcting the deviation without requiring such corrective action to be performed. On the other hand, if the direction at issue is to fold a piece of paper lengthwise down the center of the paper, but the user folded the paper on a diagonal line, this deviation may indicate that corrective action is required to move forward with creating the item, with the corrective action here being to unfold and refold the paper, or to start with a new piece of paper.

It should be understood that while the example object utilized herein is a piece of paper and the example item to be created is a paper airplane, this disclosure includes the use of any object to create any item. Other example objects, not by way of limitation, may include writing implements such as pens, pencils, markers, crayons, paint brushes, and the like, clay implements, synthetic moldable materials, crafting supplies of any kind, building blocks, sticks, metal implements of any kind, plastics of any kind including both rigid and non-rigid plastics, fluids such as paint, ink, etc., and any other object that may be utilized to create an item. Additionally, with respect to the items to be created, other examples items, again not by way of limitation, may include pottery, crafts of any kind, homework-related items, gifts, computer-related items such as circuit boards and other hardware components, and any other items that may be created utilizing some or all of the objects described herein.

One of the actions to be taken, in examples, may be to notify the user of the user device 102 that the directions are not being followed consistently and recommending corrective actions to take. These corrective actions may include augmenting the template 150 as displayed to show how the user should manipulate the object to correct the error. The corrective actions may also include augmenting the directions to describe and/or show how to correct the error. In these examples, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item.

In still other examples, particularly where a communication session with a remote device 103 is established by the communications component 140 while item creation is taking place, an indication of the deviation(s) may be provided to the remote device 103 along with recommendations for taking corrective action. In this example, the remote user may provide user input data that may be sent to the user device 102 to assist with performing a corrective action. For example, the user of the user device 102 may be a child and the user of the remote device 103 may be an adult helping the child create the item. In this example, presenting the corrective actions to the child may not allow the child, in certain circumstances, to understand and utilize those corrective actions to fix the item. However, presenting such corrective actions and indications of deviations to the adult using the remote device 103 may allow that adult to provide user input such as user utterances, touch input on the remote device 103, and/or selection of corrective actions to assist the child in performing the corrective actions. By so doing, the user device 102 and the remote device 103 may share data such that actions performed in association with the user device 102 are synchronized with display of those actions on the remote device 103, and vice versa. This may allow the remote user to see the surface, the templates 150, the directions, and/or any other information that is being utilized in association with the user device 102. This may also allow representations of user input received at the remote device 103 to be displayed using the user device 102, such as a representation of the remote user making notes, pointing to objects, providing praise, etc.

Additionally, once the item is created, the user device 102 may then be utilized to interact with the created item. For example, games, lessons, augmented reality, and/or other applications 124 may be initiated and may allow for content displayed on the surface to interact with the created item. An example of this may be that ripples of water are projected onto the surface and/or are displayed on the display 118 when the created item, such as a paper fish, is moved across the surface. To accurately display such content when the item is moved or otherwise utilized on the surface, image data of the created item may first be utilized by the computer vision component 130 to determine the shape and other attributes of the item as created. This data may be utilized by the interaction component 138 to determine deviations between item attributes of the created item and attributes of a reference item as if the item were created accurately using the directions. These deviations may include, for example, sizing differences between the created item and the reference item, color differences, components in different places, presence of extra components, etc.

The interactions component 138 may utilize these deviations to correlate which portions of the created item correspond to given portions of the reference item and may generate data indicating these correlations. Then, when the created item is detected on the surface, the correlation data may be utilized to change the way content is displayed. For example, the created item may be a toy rocket made of paper with a nose section, a tail section, and a door. A game application associated with the toy rocket may include the display of content on the surface adjacent to the user device in a manner where the content appears to be displayed on and/or around the rocket. Such content may include a depiction of outer space, stars, flames coming from the tail portion of the rocket as if flying, etc. However, to accurately determine where on the surface to display this content, the locations of portions of the created item may be determined (e.g., accurately determining where the tail section of the toy rocket is allows for accurately displaying representations of an ignition source near that portion). The data representing differences between attributes of the created item and attributes of the reference item may be utilized to accurately determine locations of the portions of the item. For example, this data may indicate, in the toy rocket example, that a nose portion is slightly bent, that the door has been placed on a different portion of the rocket than instructed, that the tail portion is partially missing, etc. The interactions component 140 can utilize these determined differences to augment how the content is displayed in relation to the created item such that even when the item is not created perfectly, it can still be utilized to interact with displayed content in an accurate manner.

As will be described in more detail, machine learning models 142 may be utilized to perform at least a portion of the processes described herein. For example, machine learning models 142 may be utilized to determine templates 150 to display, determine degrees of deviation between created items and reference items, determine what directions to display, determine what corrective actions to recommend, etc. In general, the machine learning models 142 may be utilized to intake data from the computer vision processing and from the infrared signals to make one or more of the determinations described herein with respect to the item as being created and/or the item as having already been created.

For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior item creation associated with the device 102 and/or other devices. The models may be trained for multiple user accounts and/or for a specific user account. As such, the machine learning models may be configured to learn, without human intervention, attributes of collected feedback data and computer-guided item creation and interaction to determine settings to be applied when performing such computer-guided item creation and interaction.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s)

described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102, 103. For instance, the system 104 may be located within one or more of the devices 102, 103. In some instances, some or all of the functionality of the system 104 may be performed by one or more of the devices 102, 103. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
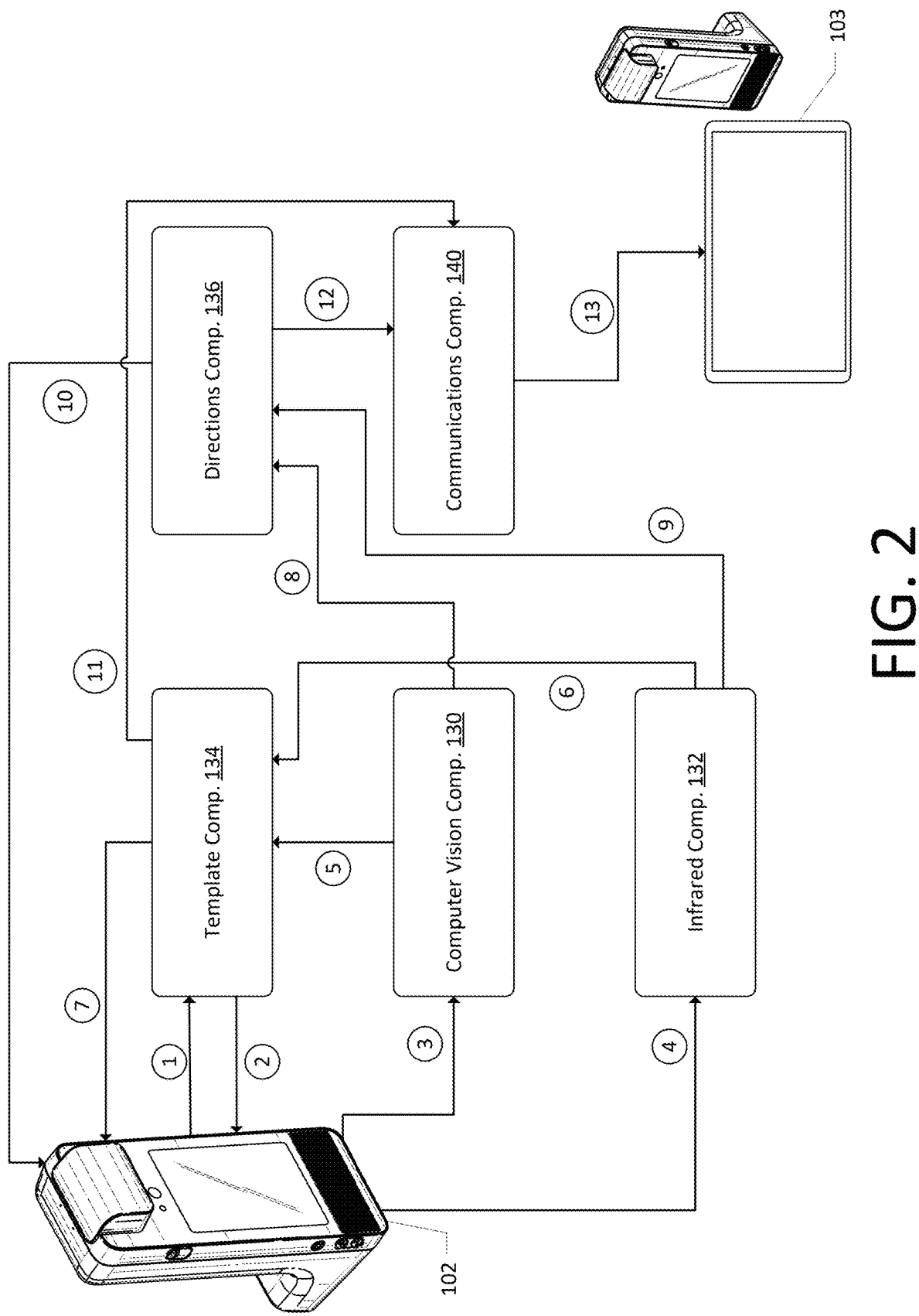
FIG. 2 illustrates a conceptual diagram of example components utilized for computer-guided item creation.

FIG. 2 illustrates a conceptual diagram of example components utilized for computer-guided item creation. FIG. 2 may include some or all of the components described with respect to FIG. 1. For example, FIG. 2 may include a user device 102, a remote device 103, a computer vision component 130, an infrared component 132, a template component 134, a directions component 136, and/or a communications components 140. These components may be utilized to guide a user through creation of an item from an object as described below with respect to steps 1-13. It should be understood, however, that there may be more or less than 13 steps and the steps described with respect to FIG. 2 may be performed in any order and/or in parallel, and need not be performed exactly in the order described below by way of example.

At step 1, the user device 102 may send user input data indicating selection of an application and/or an item to be created from an object. The user input data may be received at a system that includes the template component 134. In examples, a user may select an item to be created by providing user input indicating that selection to the user device 102 and/or to another device such as a voice interface device associated with the user device 102. In still other examples, a communication session may be established between the user device 102 and the remote device 103, and that remote device 103 may provide the user input data selecting the item to be created.

At step 2, the template component 134 may utilize the user input data to determine a template, which may also be described herein as an interactive template, to utilize to guide the user through creation of the item from the object. For example, once the item to be created is selected, the template component 134 may be queried for data representing an interactive template for creating the item from an object. The interactive template may be at least partially in the form of image data that the user device 102 may utilize to project corresponding images onto the surface adjacent to the user device 102. For example, say the item to be created is a paper airplane. The interactive template for this item may be a series of images that start as a representation of a flat piece of paper with indicators of where and how to fold the flat piece of paper to create the paper airplane. When this item-creation process is initiated with the user device 102, the interactive template may be displayed on a first portion of the surface by the projector of the user device 102. Then, the user of the user device 102 may place an object (e.g., a piece of paper) on the first portion of the surface where the interactive template is displayed. At this point, a camera of the user device 102 may capture images of the first portion of the surface, including the object as placed by the user, and corresponding image data may be sent to the computer vision component 130 for processing. The computer vision component 130 may utilize the image data to identify the object and the object's size. This object sizing data may then be utilized by the template component 134 to determine how the template should be augmented, if at all, so that the template is similarly sized to the object placed on the surface. For example, the template may start as an 8.5 by 11 inch representation of a piece of paper, but the object placed on the surface may be an 8 by 10 inch piece of paper. The computer vision component 130 and the template component 134 may be utilized to resize the representation of the piece of paper to comport with the 8 by 10 inch piece of paper.

It should be understood that anywhere in this disclosure where a projector is described as projecting images or otherwise performing projector functionality onto a surface adjacent to the user device in question, instead of or in addition to utilizing a projector, a screen may be utilized to display the images, templates, directions, etc. described herein. In this example, the surface at issue may be a surface within a field of view of a camera of the user device, and images of the surface may be captured and displayed on a screen of the device. The templates, directions, etc. may, instead of or in addition to being projected onto the surface, be displayed on the screen such that when a user of the user device views the screen, the user is presented with images of the surface as well as the templates and/or directions as described herein.

In addition to the interactive template being displayed on the first portion of the surface, directions for performing steps to create the item from the object may be displayed on a second portion of the surface. The directions may include text that the user of the user device 102 can read to assist in creating the item, and/or the directions may include images and/or videos of other users performing the steps that correspond to the directions. Utilizing the interactive template and/or the directions, the user may manipulate the object to start creating the item.

At step 3, as the user moves the user's hands within a field of view of the camera of the user device 102, and as the object is reshaped by the user, image data may continue to be generated by the camera of the user device 102. This image data may be sent to and utilized by the computer vision component 130 to determine how the user is moving and/or how the object is being reshaped. Additional details on computer vision processing are provided herein, but generally the computer vision component 130 may utilize the image data to determine what portions of the object are being manipulated by the user, how those portions are being manipulated, and what shape the object is taking as the object is manipulated by the user.

In addition to data generated by the computer vision component 130, at step 4, the infrared component 132 may be utilized to generate infrared data associated with the surface where the interactive template is being displayed. For example, infrared light may be emitted onto the surface where the template is displayed. When an object such as the piece of paper and/or a portion of a person such as a hand moves into the area where the infrared light is being emitted, the infrared light may be affected by that object and/or portion of a person's body. Data indicating these infrared light effects may be generated and utilized by the infrared component 132 to determine object location and hand location over time. This information may be utilized by the template component 134 to determine movement of objects and user implements over time.

At step 5, the visual image data, and at step 6 the infrared data, may be utilized by the template component 134 to determine degrees of deviation between reference movements associated with the directions to create the item and the user's movements and between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created consistently or inconsistently with respect to the directions.

When the degrees of deviation satisfy certain thresholds indicating that the item is being created inconsistently, the system may perform a number of actions. Once such action may be to notify the user of the user device 102 that the directions are not being followed consistently and recommending corrective actions to take. At step 7, these corrective actions may include augmenting the template as displayed to show how the user should manipulate the object to correct the error. For example, the template being displayed using the user device 102 may be changed to indicate that corrective action is needed and may show what the corrective action is. Say, for example, the item to be created is a paper airplane and the template indicated that the user is to fold a piece of paper lengthwise down the middle of the paper, but the user improperly followed the template such that the paper is folded widthwise instead of lengthwise. The template may change to display a representation of the improperly-folded paper along with indications that the paper is to be unfolded or that the user should start over with a new piece of paper.

At step 8 the visual image data, and at step 9 the infrared data, may be utilized by the directions component 136 to determine if the directions should be augmented to describe and/or show how to correct the error. When the directions are to be augmented, at step 10, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item. For example, the directions may be changed, using the example above, to provide text indicating that the user should unfold the improperly-folded paper or start over with a new piece of paper. When the directions include a video and/or images, a video and/or images may be selected for display showing a user unfolding the paper or starting over by throwing away the improperly-folded paper and grabbing a new piece of paper and putting that paper on the surface.

At step 11, the template component 134 may send data to the communications component 140 indicating progress of the user making the item from the object and/or the data indicating direction deviation and/or corrective actions including how the template has been augmented to show the corrective action(s) to be taken. Additionally, at step 12, the directions component 136 may send data indicating how the directions are being followed by the user and/or an indication of how the directions have been augmented to correct a deviation from the directions.

In these examples, particularly where a communication session with the remote device 103 is established while item creation is taking place, at step 13, an indication of the deviation(s) may be provided by the communications component 140 to the remote device 103 along with recommendations for taking corrective action. In this example, the remote user may provide user input data that may be sent to the user device 102 to assist with performing a corrective action. For example, the user of the user device 102 may be a child and the user of the remote device 103 may be an adult helping the child create the item. In this example, presenting the corrective actions to the child may not allow the child, in certain circumstances, to understand and utilize those corrective actions to fix the item. However, presenting such corrective actions and indications of deviations to the adult using the remote device 103 may allow that adult to provide user input such as user utterances, touch input on the remote device 103, and/or selection of corrective actions to assist the child in performing the corrective actions. By so doing, the user device 102 and the remote device 103 may share data such that actions performed in association with the user device 102 are synchronized with display of those actions on the remote device 103, and vice versa. This may allow the remote user to see the surface, the templates, the directions, and/or any other information that is being utilized in association with the user device 102. This may also allow representations of user input received at the remote device 103 to be displayed using the user device 102, such as a representation of the remote user making notes, pointing to objects, providing praise, etc.

Figure 3:
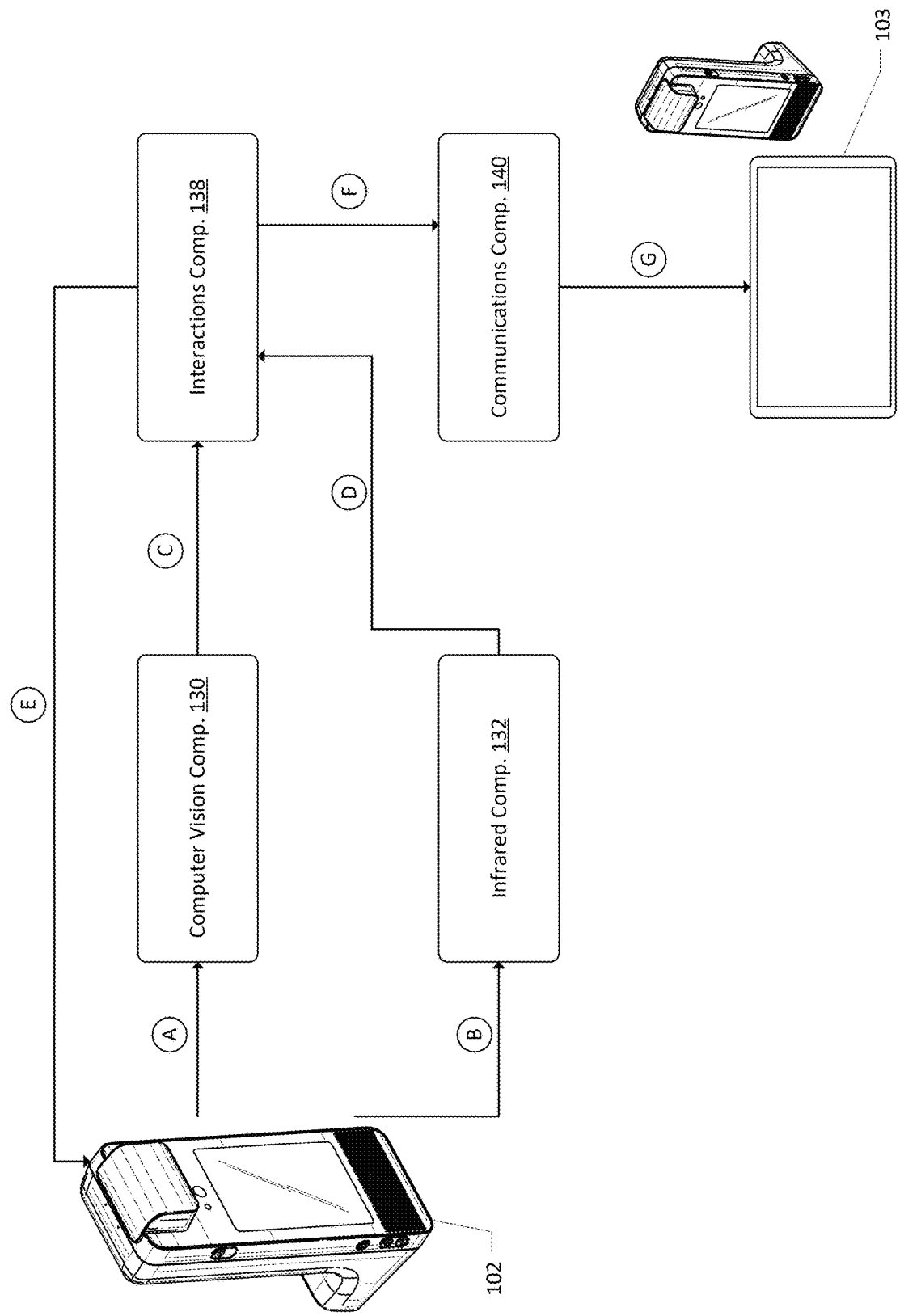
FIG. 3 illustrates a conceptual diagram of example components utilized for computer-guided item interaction with a surface on which a projector is projecting images and/or a screen is displaying images.

FIG. 3 illustrates a conceptual diagram of example components utilized for computer-guided item interaction with a surface on which a projector is projecting images. FIG. 3 may include some or all of the components described with respect to FIG. 1. For example, FIG. 3 may include a user device 102, a remote device 103, a computer vision component 130, an infrared component 132, an interactions component 138, and/or a communications components 140. These components may be utilized to display content when a created item is utilized in association with the user device 102 as described below with respect to steps A-G. It should be understood, however, that there may be more or less than the number steps shown in FIG. 3, and the steps described with respect to FIG. 3 may be performed in any order and/or in parallel, and need not be performed exactly in the order described below by way of example.

At step A, image data may be captured by a camera of the user device 102 and corresponding image data may be sent to the computer vision component 130. In this example, once the item is created, the user device may be utilized to interact with the created item. For example, games, lessons, augmented reality, and/or other applications may be initiated and may allow for content displayed on the surface to interact with the created item. An example of this may be that ripples of water are projected onto the surface when the created item, such as a paper fish, is moved across the surface. To accurately display such content when the item is moved or otherwise utilized on the surface, image data of the created item may first be utilized by the computer vision component to determine the shape and other attributes of the item as created. The image data sent to the computer vision component 130 may be utilized to identify the shape of the created item and determine the item's identity, such as a paper airline, a rocket, etc.

At step B, infrared data may be produced by the user device 102 and sent to the infrared component 132. The infrared component 132 may utilize the infrared data to determine where the item has been placed with respect to the surface and may provide other indications such as a size of the item and whether the item is being utilized by a user or standing alone on the surface.

At step C the visual image data, and at step D the infrared data, may be sent to the interactions component 138 to determine how the item as placed on the surface is interacting with the surface and/or content displayed on the surface. For example, this data may be utilized by the interaction component 138 to determine deviations between item attributes of the created item and attributes of a reference item as if the item were created accurately using the directions. These deviations may include, for example, sizing differences between the created item and the reference item, color differences, components in different places, presence of extra components, etc. The interactions component 138 may utilize these deviations to correlate which portions of the created item correspond to given portions of the reference item and may generate data indicating these correlations. Then, when the created item is detected on the surface, the correlation data may be utilized to change the way content is displayed at step E. For the example, the created item may be a toy rocket made of paper with a nose section, a tail section, and a door. A game application associated with the toy rocket may include the display of content on the surface adjacent to the user device in a manner where the content appears to be displayed on and/or around the rocket. Such content may include a depiction of outer space, stars, flames coming from the tail portion of the rocket as if flying, etc. However, to accurately determine where on the surface to display this content, the locations of portions of the created item may be determined (e.g., accurately determining where the tail section of the toy rocket is allows for accurately displaying representations of flames near that portion). The data representing differences between attributes of the created item and attributes of the reference item may be utilized to accurately determine locations of the portions of the item. For example, this data may indicate, in the toy rocket example, that a nose portion is slightly bent, that the door has been placed on a different portion of the rocket than instructed, that the tail portion is partially missing, etc. The interactions component 138 can utilize these determined differences at step E to augment how the content is displayed in relation to the created item such that even when the item is not created perfectly, it can still be utilized to interact with displayed content in an accurate manner.

At step F, the interactions component 138 may send data indicating how the content is being displayed on the user device 102 to the communications component 140. For example, when a communications session is established between the user device 102 and the remote device 103, the communications component 140 may be utilized to receive data indicating how the item interaction is occurring with respect to the user device 102.

At step G, the communications component 140 may send data indicating the interactions of the item to the remote device 103, which may display images of the surface with the item thereon, may display the content selected and augmented as described above, may display indicators and/or recommendations to assist the user of the user device 102 with interaction of the item with the content, etc. Additionally, the communications component 140 may receive data indicating interactions of the remote user with the remote device 103 and may utilize that data to cause presentation of information to the user of the user device 102. Such information may include audio representing user utterances of the remote user captured at the remote device 103, indications of user touch input received at the remote device 103, selection of recommendations at the remote device 103, etc.

FIGS. 4-9 illustrates processes for computer-guided item creation and interaction. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, and 10-15, although the processes may be implemented in a wide variety of other environments, architectures and systems.

Figure 4:
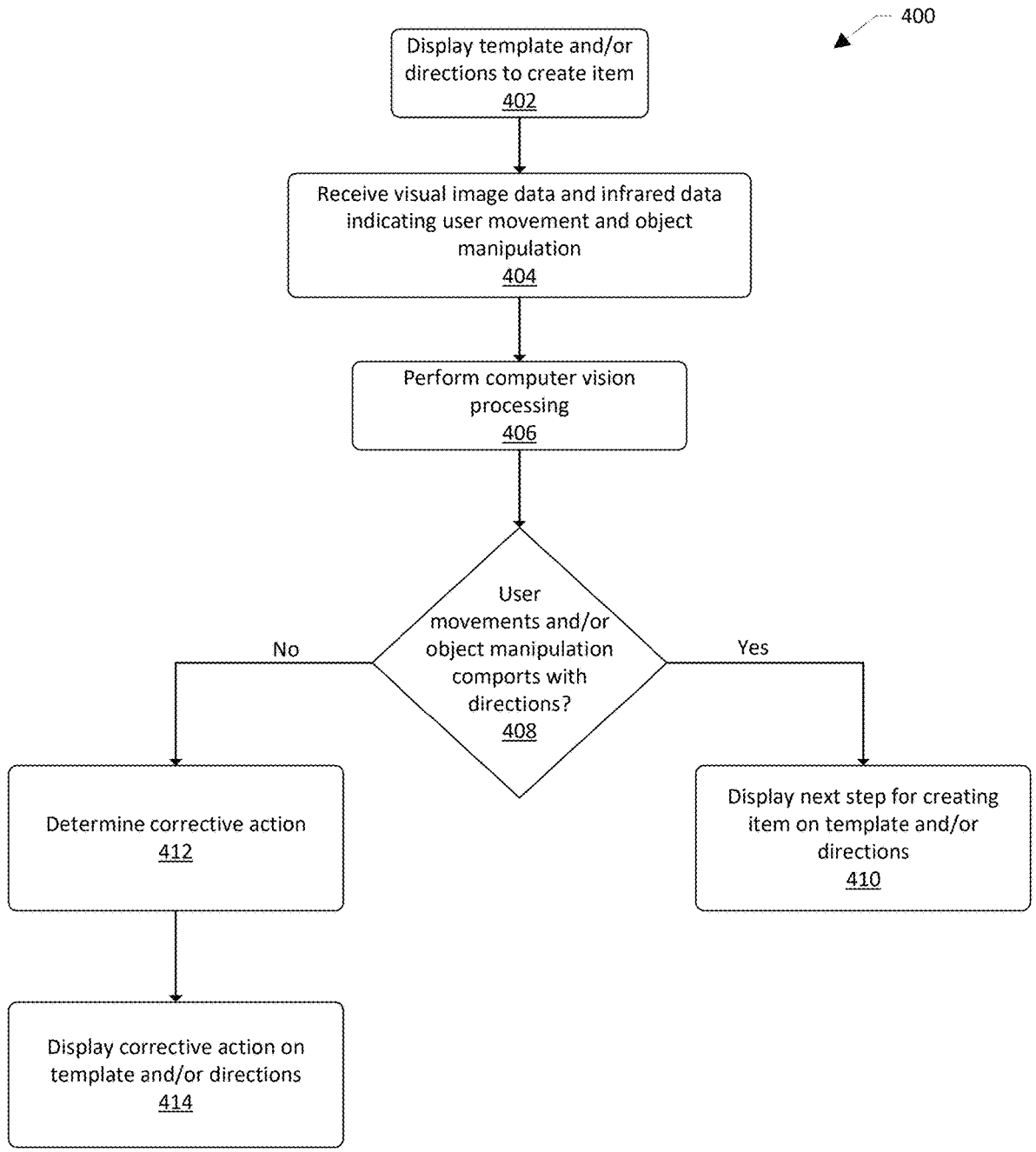
FIG. 4 illustrates a flow diagram of an example process for real-time evaluation of item creation utilizing computer vision processing and infrared data.

FIG. 4 illustrates a flow diagram of an example process 400 for real-time evaluation of item creation utilizing computer vision processing and infrared data. The order in which the operations or steps are described is not intended to be construed as a limitation, and any number of the described operations may be combined in any order and/or in parallel to implement process 400.

At block 402, the process 400 may include displaying a template and/or directions to create an item. For example, a template component may be queried for data representing an interactive template for creating an item from an object. The interactive template may be at least partially in the form of image data that the user device may utilize to project corresponding images onto the surface adjacent to the user device. For example, say the item to be created is a paper airplane. The interactive template for this item may be a series of images that start as a representation of a flat piece of paper with indicators of where and how to fold the flat piece of paper to create the paper airplane. In addition to the interactive template being displayed on the first portion of the surface, directions for performing steps to create the item from the object may be displayed on a second portion of the surface. The directions may include text that the user of the user device can read to assist in creating the item, and/or the directions may include images and/or videos of other users performing the steps that correspond to the directions.

At block 404, the process 400 may include receiving visual image data and infrared data indicating user movement and object manipulation. For example, a camera of the user device may capture images of the surface where the template and/or the directions are being projected. Corresponding image data may be generated that may show the surface and objects within a field of view of the camera, including, for example, the object being manipulated to create the item and/or user implements such as user hands and/or tools being utilized to manipulate the object to create the item. Additionally, infrared data may be received indicate locations of objects and/or user implements and how those locations change over time.

At block 406, the process 400 may include performing computer vision processing. For example, the computer vision processing may include determining a size of the object and how that object size changes as the user manipulates the object to create the item. The computer vision processing may also include determining a shape of the object and how the shape of the object changes as the user manipulates the object to create the item. Other examples of computer vision processing may include detection of certain object attributes such as color, movement, connections with other objects, etc.

At block 408, the process 400 may include determining whether user movements and/or object manipulation comports with the directions. For example, the visual image data may be utilized by a template component to determine degrees of deviation between reference movements associated with the directions to create the item and the user's movements and between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created properly or improperly.

In examples where the user movements and/or object manipulation comports with the directions, the process 400 may include, at block 410, displaying next steps for creating the item on the template and/or directions. In this example, the visual image data may indicate that the user has not deviated from the directions for creating the item and/or that the deviation from the directions is not substantial enough to merit a corrective action being taken. In other words, the user may be following the template and/or directions for creating the item and thus a next step in the process for creating the item may be displayed such that the user may continue to create the item from the object.

In examples where the user movements and/or object manipulation does not comport with the directions, the process 400 may include, at block 412, determining a corrective action. For example, when the degrees of deviation satisfy certain thresholds indicating that the item is being created improperly, the system may perform a number of actions. Once such action may be to notify the user of the user device that the directions are not being followed properly and recommending corrective actions to take. These corrective actions may include augmenting the template as displayed to show how the user should manipulate the object to correct the error. The corrective actions may also include augmenting the directions to describe and/or show how to correct the error. In these examples, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item.

At block 414, the process 400 may include displaying the corrective action on the template and/or on the directions. For example, having selected the corrective action to be taken, data indicating the corrective action may be sent to the user device such that the user device may display the corrective action, such as by showing an augmented version of the template, different directions for taking the corrective action, etc. In other examples, display of the corrective action may occur on a remote device and a user of the remote device may select how to utilize the information indicating the corrective action to assist the user of the user device with performing the corrective action.

Figure 5:
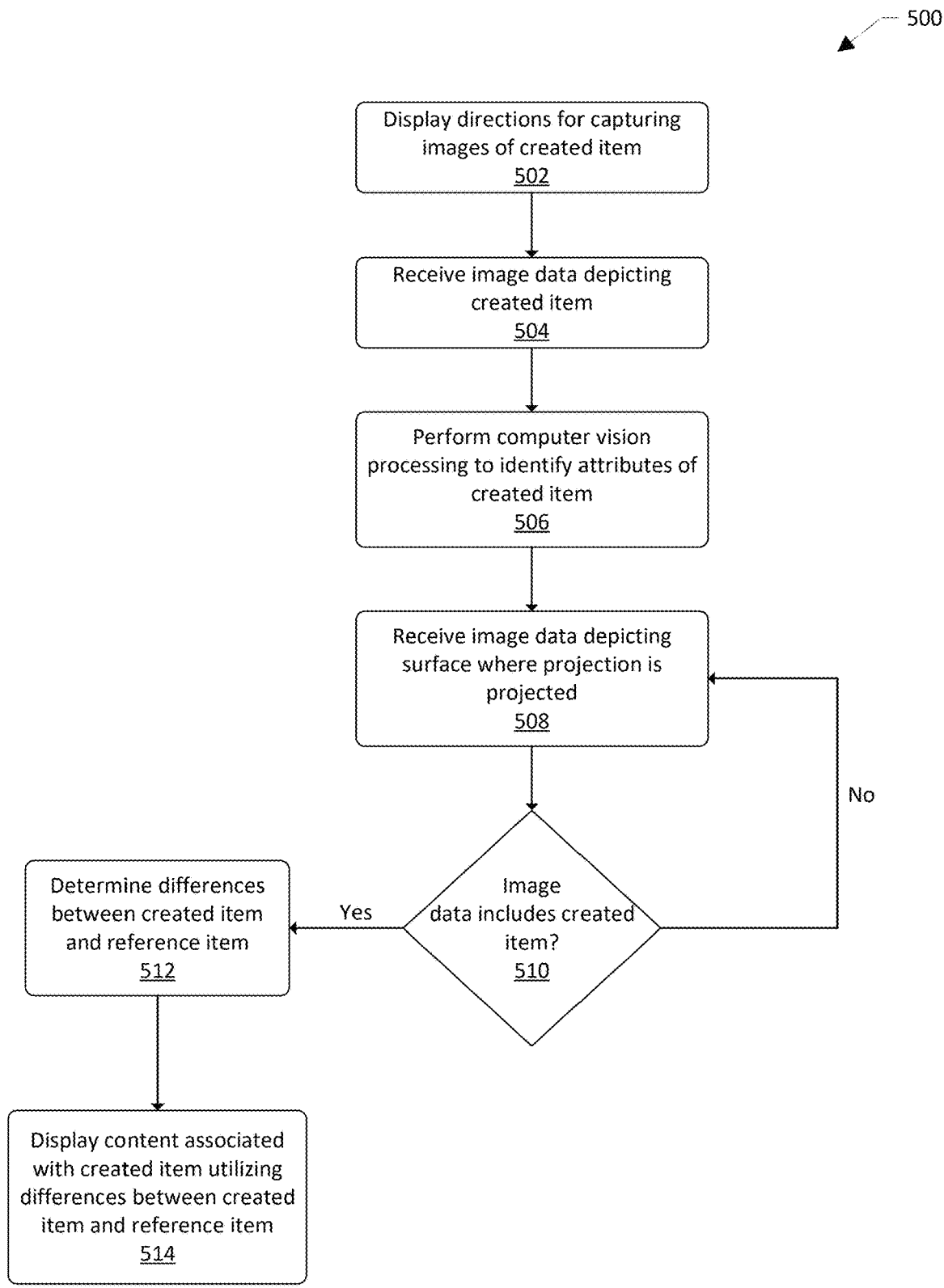
FIG. 5 illustrates a flow diagram of an example process for identifying differences between a created item and a reference item for dynamically manipulating content displayed in association with the created item.

FIG. 5 illustrates a flow diagram of an example process 500 for identifying differences between a created item and a reference item for dynamically manipulating content displayed in association with the created item. The order in which the operations or steps are described is not intended to be construed as a limitation, and any number of the described operations may be combined in any order and/or in parallel to implement process 500.

At block 502, the process 500 may include displaying directions for capturing images of a created item. For example, once an item is created as described herein, data representing directions for capturing images of the created item for the purpose of determining attributes of the item may be sent to the user device to cause the user device to display or otherwise project the directions. The directions may include an indication of the purpose for capturing images of the item, such as to determine the item attributes, as well as directions for the user to place the item at a certain location associated with the surface. For example, the directions may include image data that may be utilized by the projector to project a shape, such as a square, in which the user is directed to place the item. It should be understood that the shape may be any shape and/or any size. The directions may also include, in examples, audio data that may be utilized to output corresponding audio directing the user to place the item at a certain location of the surface. The directions may indicate that the user is to move the item in different ways during image capture to ensure the entirety of the item is captured by the camera of the user device.

At block 504, the process 500 may include receiving image data depicting the created item. For example, as the images of the item are captured, corresponding image data may be generated and may be sent to a system that includes a computer vision component.

At block 506, the process 500 may include performing computer vision processing to identify attributes of the created item. For example, the computer vision processing may indicate attributes of the created item such as item size, item shape, item color, segments of the item, identifying markings of the item such as text written the item, etc. These item attributes may be utilized to uniquely identify the item as created.

At block 508, the process 500 may include receiving image data depicting a surface where the projection is being projected. This image data may be received over time and/or when motion is detected with respect to the surface, such as by utilizing infrared data indicating how infrared light is altered by objects coming within a field of the infrared data as output by the user device.

At block 510, the process 500 may include determining whether the image data includes the created item. For example, computer vision processing may be performed on the image data to detect whether an item is on the surface and to detect whether the item includes the item attributes determined above. This process may include detection of the attributes and a determination if certain attributes and/or a certain number of the attributes are detected. In examples where the certain attributes and/or number of attributes are detected, the system may determine that the item is depicted in the image data. When the certain attributes and/or number of attributes are not detected, the system may determine that the item is not detected and/or may query the user to take certain actions to confirm or deny that the item placed on the surface is the created item.

In examples where the image data does not include the created item, the process 500 may return to block 508 where additional image data may be received over time and that additional image data may be analyzed to determine if the created item is at some point positioned on the surface.

In examples where the image data includes the created item, the process 500 may include, at block 512, determining differences between the created item and a reference item. For example, an interaction component may determine deviations between item attributes of the created item and attributes of a reference item as if the item were created accurately using the directions. These deviations may include, for example, sizing differences between the created item and the reference item, color differences, components in different places, presence of extra components, etc. The interactions component may utilize these deviations to correlate which portions of the created item correspond to given portions of the reference item and may generate data indicating these correlations.

At block 514, the process 500 may include displaying content associated with the created item utilizing differences between the created item and the reference item. For example, when the created item is detected on the surface, the correlation data may be utilized to change the way content is displayed. For the example, the created item may be a toy rocket made of paper with a nose section, a tail section, and a door. A game application associated with the toy rocket may include the display of content on the surface adjacent to the user device in a manner where the content appears to be displayed on and/or around the rocket. Such content may include a depiction of outer space, stars, flames coming from the tail portion of the rocket as if flying, etc. However, to accurately determine where on the surface to display this content, the locations of portions of the created item may be determined (e.g., accurately determining where the tail section of the toy rocket is allows for accurately displaying representations of flames near that portion). The data representing differences between attributes of the created item and attributes of the reference item may be utilized to accurately determine locations of the portions of the item. For example, this data may indicate, in the toy rocket example, that a nose portion is slightly bent, that the door has been placed on a different portion of the rocket than instructed, that the tail portion is partially missing, etc. The interactions component can utilize these determined differences to augment how the content is displayed in relation to the created item such that even when the item is not created perfectly, it can still be utilized to interact with displayed content in an accurate manner.

Figure 6:
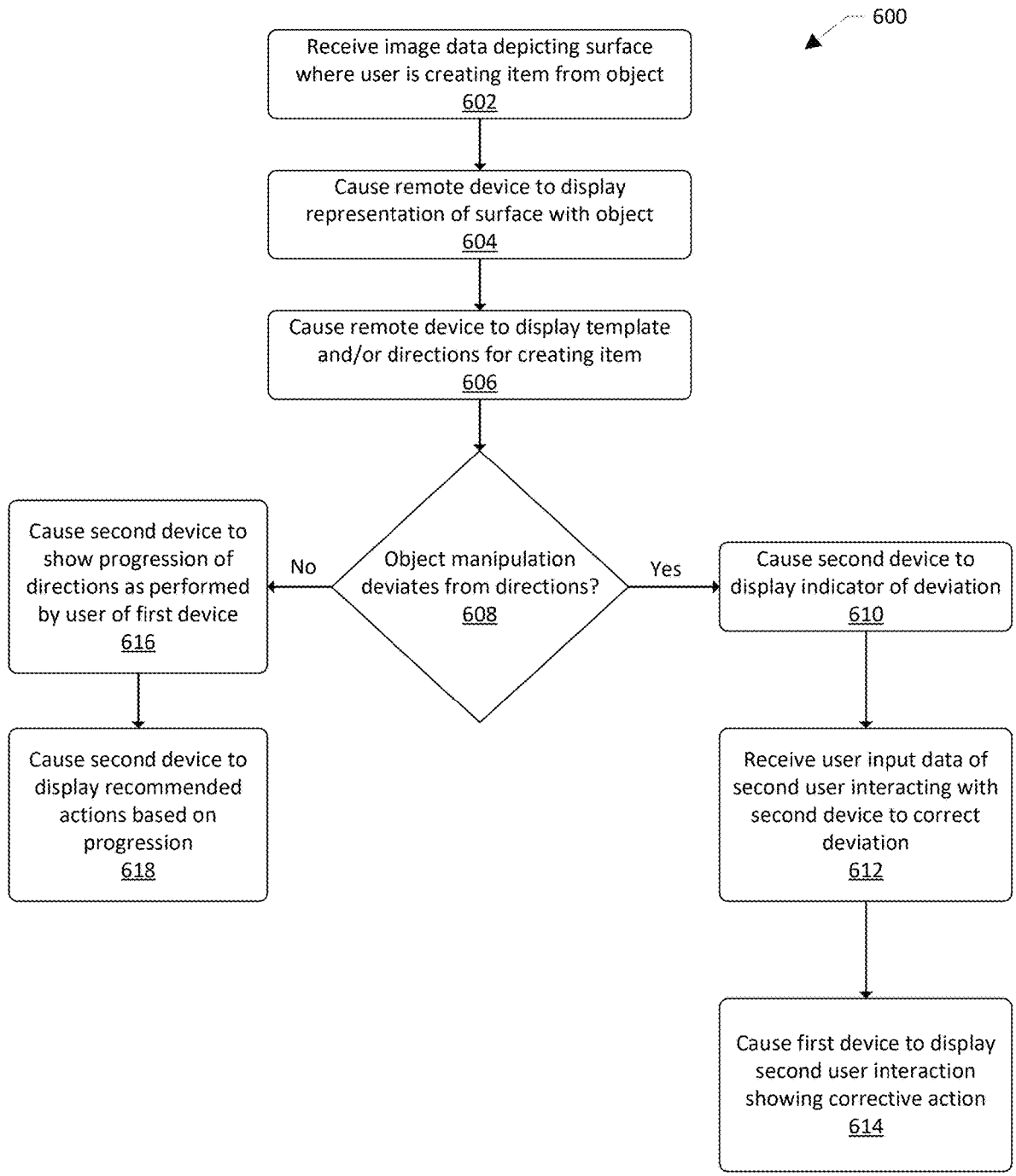
FIG. 6 illustrates a flow diagram of an example process for real-time display of information associated with creation and interaction of an item on a remote device in communication with the user device.

FIG. 6 illustrates a flow diagram of an example process 600 for real-time display of information associated with creation and interaction of an item associated with a user device on a remote device in communication with the user device. The order in which the operations or steps are described is not intended to be construed as a limitation, and any number of the described operations may be combined in any order and/or in parallel to implement process 600.

At block 602, the process 600 may include receiving image data depicting a surface where a user is creating an item from an object. This image data may be received over time and/or when motion is detected with respect to the surface, such as by utilizing infrared data indicating how infrared light is altered by objects coming within a field of the infrared data as output by the user device.

At block 604, the process 600 may include causing a remote device to display a representation of the surface with the object. For example, a communications session may be established between the user device and the remote device. In this example, sharing of data between the user device and the remote device may be enabled, and thus interactions between a user of the user device and the surface in question may be captured and shared with the remote device. This may include capturing images of the surface and sending corresponding image data depicting the surface to the remote device such that the user of the remote device may see the surface in real time or near real time as a user interacts with the surface.

At block 606, the process 600 may include causing the remote device to display a template and/or directions for creating the item. For example, in a similar manner to how the user device displays the template and/or directions, the remote device may also display the template and/or directions. To do so, data representing the template and/or directions may be sent to the remote device, which may display the template and/or directions as an overlay to the images of the surface associated with the user device. In other examples, the images of the surface themselves may depict the projected template and/or directions. Instill other examples, the template and/or directions displayed on the remote device may differ from that displayed using the user device. For example, the template and/or directions may be more or less complicated as displayed on the remote device given the user profile of the remote device (e.g., an adult user as opposed to a child user of the user device).

At block 608, the process 600 may include determining whether object manipulation as performed by the user deviates from the directions. For example, visual image data may be utilized by a template component to determine degrees of deviation between reference movements associated with the directions to create the item and the user's movements and between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created properly or improperly.

In examples where the object manipulation deviates from the directions, the process 600 may include, at block 610, causing a second device to display an indicator of the deviation. For example, instead of determining a corrective action to be taken in light of the user movement and/or object manipulation deviations and displaying that corrective action to the user of the user device, the system may determine that notifying the user of the remote device is preferable. An example of this may be when the user device is associated with a child profile and when the remote device is associated with an adult profile. In this example, recommending a corrective action to the child may not result in the corrective action being taken or being performed correctly. Instead, the indicator of the deviation may be displayed on the remote device, such that the user of the remote device can determine how to assist the user of the user device in making a corrective action.

At block 612, the process 600 may include receiving user input data of a second user interacting with the second device to correct the deviation. For example, the user of the remote device may receive the indicator of the deviation and may determine how to assist the user of the user device. Such user input data may include user utterances that may be captured by a microphone of the remote device. Other user input data may include touch input received on a screen of the remote device indicating user movements that are meant to show the user of the user device what actions to take to make a corrective action. Other user input may include selection of a recommended corrective action, such as from a list of potential corrective actions. Other user input data may include video recorded of the remote device user performing the corrective action and meant to be sent to the user device for display for the user of the user device.

At block 614, the process 600 may include causing the first device to display the second user interaction showing a corrective action to be taken. For example, audio representing the user utterances may be output, representations of the touch input may be projected onto the surface, the video of the user may be output, display of the selected corrective action may be performed, etc.

Returning to block 608, in examples where the object manipulation does not deviate from the directions at least to a threshold degree, the process 600 may include, at block 616, causing the second device to show progression of the directions as performed by the user of the first device. In this example, an indication that the user of the user device is accurately following the directions for creating the item may be output on the remote device.

At block 618, the process 600 may include causing the second device to display recommended actions based on the progression. For example, an indicator of where the user of the user device is in the process for completing creation of the item from the object may be displayed. The recommended actions may include actions relating to praising the user of the user device for completing a step, a recommendation to instruct the user to move to a next step of the item creation process, etc.

Figure 7:
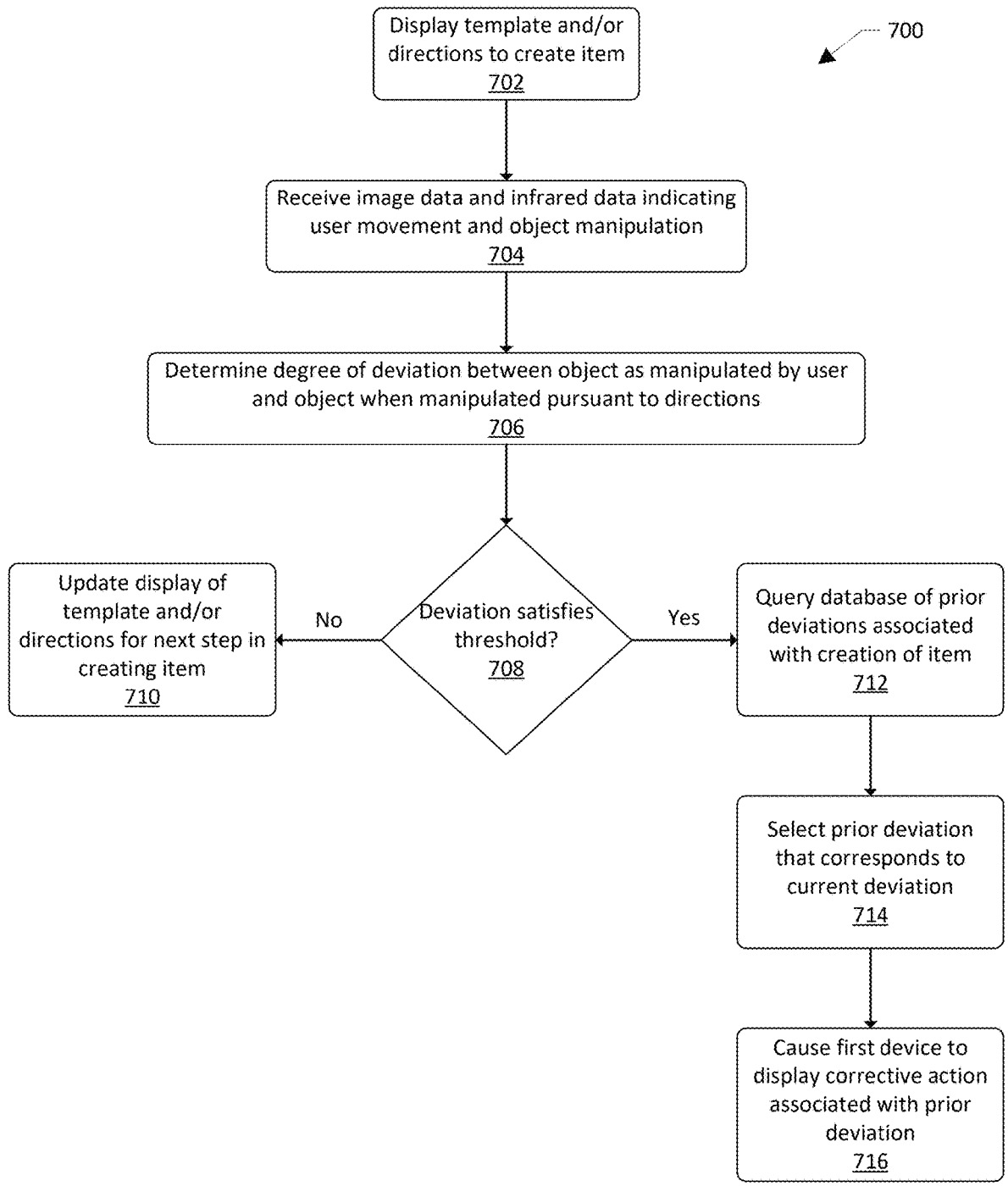
FIG. 7 illustrates a flow diagram of an example process for indexing item creation deviations to assist in real-time corrective action.

FIG. 7 illustrates a flow diagram of an example process 700 for indexing item creation deviations to assist in real-time corrective action. The order in which the operations or steps are described is not intended to be construed as a limitation, and any number of the described operations may be combined in any order and/or in parallel to implement process 700.

At block 702, the process 700 may include displaying a template and/or directions to create an item. For example, a template component may be queried for data representing an interactive template for creating an item from an object. The interactive template may be at least partially in the form of image data that the user device may utilize to project corresponding images onto the surface adjacent to the user device. For example, say the item to be created is a paper airplane. The interactive template for this item may be a series of images that start as a representation of a flat piece of paper with indicators of where and how to fold the flat piece of paper to create the paper airplane. In addition to the interactive template being displayed on the first portion of the surface, directions for performing steps to create the item from the object may be displayed on a second portion of the surface. The directions may include text that the user of the user device can read to assist in creating the item, and/or the directions may include images and/or videos of other users performing the steps that correspond to the directions.

At block 704, the process 700 may include receiving image data and infrared data indicating user movement and object manipulation. For example, a camera of the user device may capture images of the surface where the template and/or the directions are being projected. Corresponding image data may be generated that may show the surface and objects within a field of view of the camera, including, for example, the object being manipulated to create the item and/or user implements such as user hands and/or tools being utilized to manipulate the object to create the item. Additionally, infrared data may be received indicate locations of objects and/or user implements and how those locations change over time.

At block 706, the process 700 may include determining a degree of deviation between the object as manipulated by a user and the object when manipulated pursuant to the directions. For example, the visual image data may be utilized by a template component to determine degrees of deviation between reference movements associated with the directions to create the item and the user's movements and between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created properly or improperly.

At block 708, the process 700 may include determining whether the deviation degree satisfies a threshold degree of deviation. For example, the degree of deviation may indicate that the user's movements and/or the shape of the object as manipulated by the user differs only slightly from user movements and/or object shapes when the directions are followed correctly. In this example, the deviation degree may not satisfy the threshold degree of deviation indicating that the user is creating the item properly from the directions. In other examples, the user movements and/or object shape may depart markedly from user movements and/or object shapes if the directions were followed correctly. In these examples, the deviation degree may satisfy the threshold degree of deviation. Determining whether the deviation degree satisfies the threshold degree of deviation may be based at least in part on distance measurements associated with the user movements and object shapes. For example, the positioning of the user's hand may be compared to a reference positioning to determine a distance between those positions with respect to the surface. Shorter distances may indicate less deviation from the reference positioning. Likewise, measurements of components of the object being manipulated may be compared to measurements of a reference object to determine distances between components. Shorter distances may indicate less deviation from the reference shape.

In examples where the degree of deviation does not satisfy the threshold degree of deviation, the process 700 may include, at block 710, updating display of the template and/or directions for next steps in creating the item. In this example, the user may have properly followed the directions to perform the step in question for creating the item, and thus the template and/or directions may be updated with display and/or direct the next step for creating the item.

In examples where the degree of deviation satisfies the threshold degree of deviation, the process 700 may include, at block 712, querying a database of prior deviations associated with creation of the item. In these examples, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item.

At block 714, the process 700 may include selecting a prior deviation that corresponds to the current deviation. For example, the deviation in question may be classified based on the type of deviation that occurred, such as an improper fold at a given portion of the object, an incomplete step taken by the user, etc. The determined user movements and/or the determined object shape both before and after the user manipulated the object may be utilized to classify the deviation. An indicator of these classifications may be stored in association with the prior deviations such that the database can be queried based at least in part on these classifications.

At block 716, the process 700 may include causing the first device to display a corrective action associated with the selected prior deviation. For example, the corrective action may include an updated template showing an action to be performed to correct the deviation. The corrective action may also include a video and/or images of a user performing the corrective action. The corrective action may also include querying a remote device for assistance to be given to the project device user. The corrective action may also include text data including instructions for correcting the deviation. It should be understood that the corrective action may be any action as determined by querying the database for prior deviations.

Figure 8:
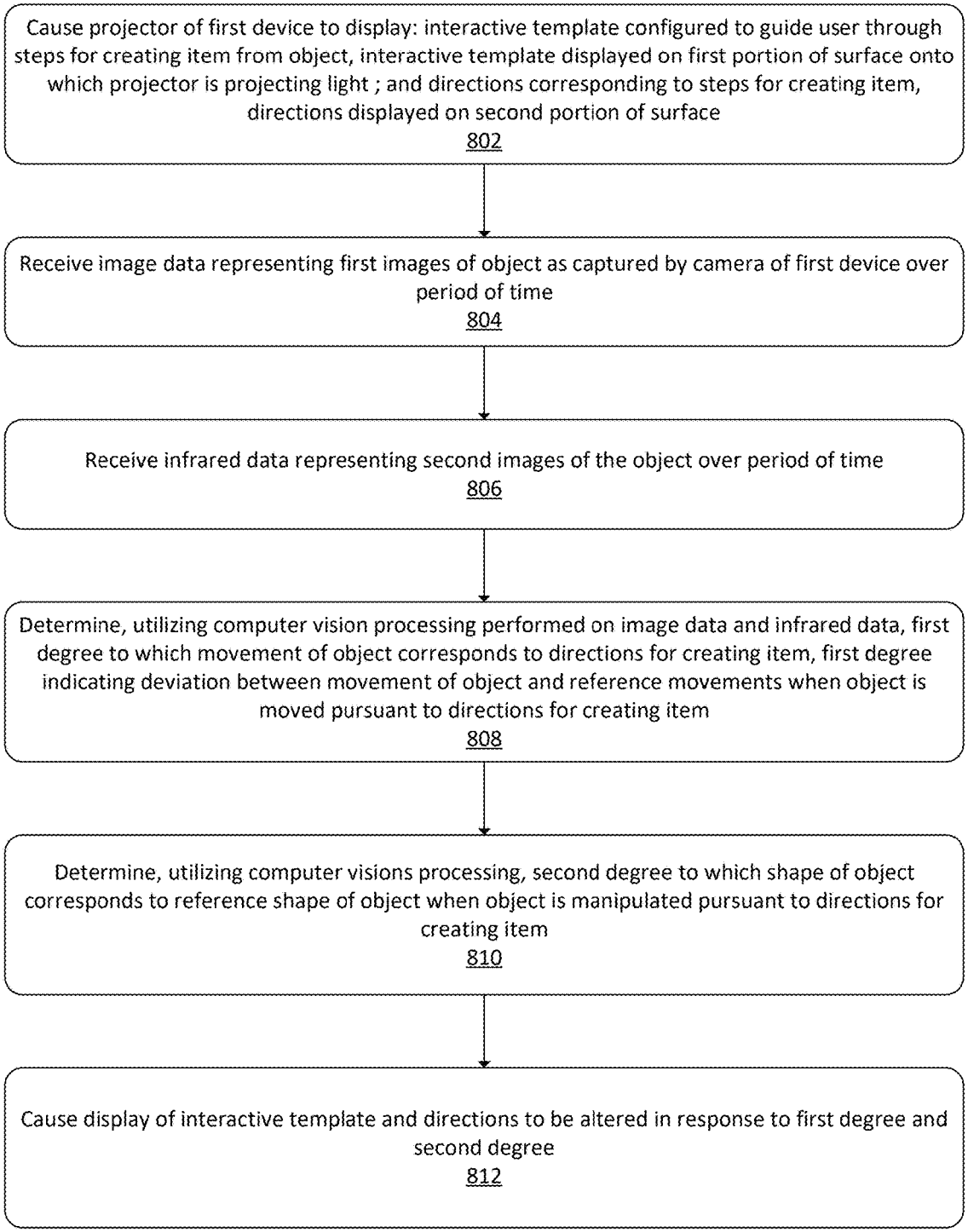
FIG. 8 illustrates a flow diagram of an example process for computer-guided item creation and interaction.

FIG. 8 illustrates a flow diagram of an example process 800 for computer-guided item creation and interaction. The order in which the operations or steps are described is not intended to be construed as a limitation, and any number of the described operations may be combined in any order and/or in parallel to implement process 800.

At block 802, the process 800 may include causing a projector of a first device to display: an interactive template configured to guide a user through steps for creating an item from an object, the interactive template displayed on a first portion of a surface onto which the projector is projecting light; and directions corresponding to the steps for creating the item, the directions displayed on a second portion of the surface. For example, a template component may be queried for data representing an interactive template for creating an item from an object. The interactive template may be at least partially in the form of image data that the user device may utilize to project corresponding images onto the surface adjacent to the user device. For example, say the item to be created is a paper airplane. The interactive template for this item may be a series of images that start as a representation of a flat piece of paper with indicators of where and how to fold the flat piece of paper to create the paper airplane. In addition to the interactive template being displayed on the first portion of the surface, directions for performing steps to create the item from the object may be displayed on a second portion of the surface. The directions may include text that the user of the user device can read to assist in creating the item, and/or the directions may include images and/or videos of other users performing the steps that correspond to the directions.

At block 804, the process 800 may include receiving first image data representing images of the object as captured by a camera of the first device over a period of time. For example, a camera of the user device may capture images of the surface where the template and/or the directions are being projected. Corresponding image data may be generated that may show the surface and objects within a field of view of the camera, including, for example, the object being manipulated to create the item and/or user implements such as user hands and/or tools being utilized to manipulate the object to create the item.

At block 806, the process 800 may include receiving infrared data representing second images the object over the period of time. For example, infrared data may be received indicate locations of objects and/or user implements and how those locations change overtime. Infrared light may be emitted onto the surface where the template is displayed. When an object such as the piece of paper and/or a portion of a person such as a hand moves into the area where the infrared light is being emitted, the infrared light may be affected by that object and/or portion of a person's body. Data indicating these infrared light effects may be generated and utilized by the infrared component to determine object location and hand location over time.

At block 808, the process 800 may include determining, utilizing computer vision processing performed on the image data and the infrared data, a first degree to which movement of the object corresponds to the directions for creating the item, the first degree indicating a deviation between the movement of the object and reference movements when the object is moved pursuant to the directions for creating the item. For example, computer vision processing may include determining a size of the object and how that object size changes as the user manipulates the object to create the item. The computer vision processing may also include determining a shape of the object and how the shape of the object changes as the user manipulates the object to create the item. Other examples of computer vision processing may include detection of certain object attributes such as color, movement, connections with other objects, etc. The visual image data may be utilized by a template component to determine degrees of deviation between reference movements associated with the directions to create the item and the user's movements.

At block 810, the process 800 may include determining, utilizing the computer visions processing, a second degree to which a shape of the object corresponds to a reference shape of the object when the object is manipulated pursuant to the directions for creating the item. For example, the computer vision processing may be utilized to determine differences between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created properly or improperly.

At block 812, the process 800 may include causing display of the interactive template and the directions to be altered in response to the first degree and the second degree. For example, when the degrees of deviation satisfy certain thresholds indicating that the item is being created improperly, the system may perform a number of actions. Once such action may be to notify the user of the user device that the directions are not being followed properly and recommending corrective actions to take. These corrective actions may include augmenting the template as displayed to show how the user should manipulate the object to correct the error. The corrective actions may also include augmenting the directions to describe and/or show how to correct the error. In these examples, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item. Having selected the corrective action to be taken, data indicating the corrective action may be sent to the user device such that the user device may display the corrective action, such as by showing an augmented version of the template, different directions for taking the corrective action, etc. In other examples, display of the corrective action may occur on a remote device and a user of the remote device may select how to utilize the information indicating the corrective action to assist the user of the user device with performing the corrective action.

Additionally, or alternatively, the process 800 may include causing a second device that is remote from the first device to display the images of the object in relation to the surface. The process 800 may also include causing the second device to display, in response to the first degree and the second degree, an indication of how the object as manipulated by the user deviates from the interactive template and the directions. The process 800 may also include receiving user input data from the second device, the user input data representing an interaction configured to show the user of the first device a corrective action to be taken to reduce the deviation between the object as manipulated by the user and the reference shape of the object. The process 800 may also include causing the first device to display a representation of the interaction on the first portion of the surface corresponding to the interactive template.

Additionally, or alternatively, the process 800 may include storing first data indicating prior degrees of movement deviation associated with the interactive template and storing second data indicating prior degrees of shape deviation association with the item to be created. The process 800 may also include determining, by analyzing the first degree in association with the first data and by analyzing the second degree in association with the second data, a classification for how the object as manipulated by the user deviates from the object as correctly manipulated to create the item. The process 800 may also include selecting, from an index of corrective actions, a corrective action that is associated with the classification. In these examples, causing display of the interactive template and the directions to be altered may include causing display of the corrective action.

Additionally, or alternatively, the process 800 may include determining, utilizing the computer vision processing, a shape of the item created from the object. The process 800 may also include identifying a reference shape of the item and determining first data indicating differences between the shape of the item and the reference shape of the item. The process 800 may also include generating, utilizing the first data, second data that correlates portions of the item as created from the object with portions of the reference shape of the item. The process 800 may also include determining that the item is within a field of view of the camera of the first device. The process 800 may also include causing display of content in association with the item utilizing the second data to determine where, on the surface, to display the content such that the content is displayed in association with the item as if the content were displayed for the reference shape of the item.

Figure 9:
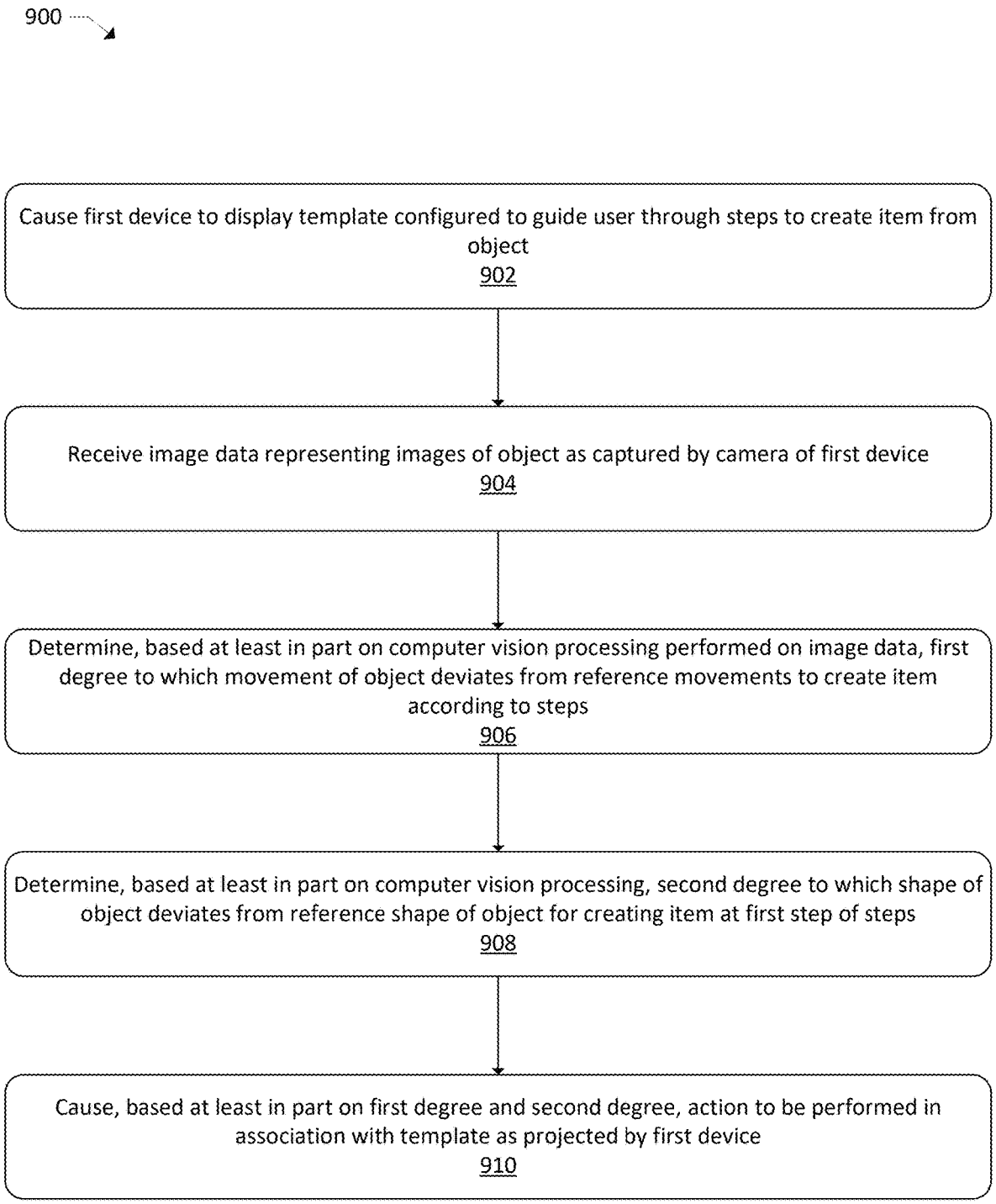
FIG. 9 illustrates a flow diagram of another example process for computer-guided item creation and interaction.

FIG. 9 illustrates a flow diagram of another example process 900 for computer-guided item creation and interaction. The order in which the operations or steps are described is not intended to be construed as a limitation, and any number of the described operations may be combined in any order and/or in parallel to implement process 900.

At block 902, the process 900 may include causing a first device to display a template configured to guide a user through steps to create an item from an object. For example, a template component may be queried for data representing an interactive template for creating an item from an object. The interactive template may be at least partially in the form of image data that the user device may utilize to project corresponding images onto the surface adjacent to the user device. For example, say the item to be created is a paper airplane. The interactive template for this item may be a series of images that start as a representation of a flat piece of paper with indicators of where and how to fold the flat piece of paper to create the paper airplane. In addition to the interactive template being displayed on the first portion of the surface, directions for performing steps to create the item from the object may be displayed on a second portion of the surface. The directions may include text that the user of the user device can read to assist in creating the item, and/or the directions may include images and/or videos of other users performing the steps that correspond to the directions.

At block 904, the process 900 may include receiving image data representing images of the object as captured by a camera of the first device. For example, a camera of the user device may capture images of the surface where the template and/or the directions are being projected. Corresponding image data may be generated that may show the surface and objects within a field of view of the camera, including, for example, the object being manipulated to create the item and/or user implements such as user hands and/or tools being utilized to manipulate the object to create the item.

At block 906, the process 900 may include determining, based at least in part on computer vision processing performed on the image data, a first degree to which movement of the object deviates from reference movements to create the item according to the steps. For example, computer vision processing may include determining a size of the object and how that object size changes as the user manipulates the object to create the item. The computer vision processing may also include determining a shape of the object and how the shape of the object changes as the user manipulates the object to create the item. Other examples of computer vision processing may include detection of certain object attributes such as color, movement, connections with other objects, etc. The visual image data may be utilized by a template component to determine degrees of deviation between reference movements associated with the directions to create the item and the user's movements.

At block 908, the process 900 may include determining, based at least in part on the computer vision processing, a second degree to which a shape of the object deviates from a reference shape of the object for creating the item at a first step of the steps. For example, the computer vision processing may be utilized to determine differences between reference shapes associated with the item if created pursuant to the directions and the item as currently being created by the user. These degrees of deviation may indicate that the user is or is not manipulating the appropriate portion of the object for a given step in the directions, that the user is or is not performing the steps in a predefined range of time, that the user has manipulated the shape of the object within a threshold range that is acceptable for the given step of the directions, and/or that the item being created is otherwise being created properly or improperly.

At block 910, the process 900 may include causing, based at least in part on the first degree and the second degree, an action to be performed in association with the template as displayed by the first device. For example, when the degrees of deviation satisfy certain thresholds indicating that the item is being created improperly, the system may perform a number of actions. Once such action may be to notify the user of the user device that the directions are not being followed properly and recommending corrective actions to take. These corrective actions may include augmenting the template as displayed to show how the user should manipulate the object to correct the error. The corrective actions may also include augmenting the directions to describe and/or show how to correct the error. In these examples, a database of previously-identified errors for creating the item in question may be maintained, and the visual image data and infrared data may be utilized to determine which of the previously-identified errors most closely resembles the error made by the user in question. The database may include templates, directions, and/or other data that may be selected to be presented to the user to correct the error made while creating the item. Having selected the corrective action to be taken, data indicating the corrective action may be sent to the user device such that the user device may display the corrective action, such as by showing an augmented version of the template, different directions for taking the corrective action, etc. In other examples, display of the corrective action may occur on a remote device and a user of the remote device may select how to utilize the information indicating the corrective action to assist the user of the user device with performing the corrective action.

Additionally, or alternatively, the process 900 may include causing a second device that is remote from the first device to display the images of the object. The process 900 may also include causing the second device to display an indication of how the object as manipulated deviates from the template. The process 900 may also include receiving user input data representing an interaction with a representation of the object as displayed on the second device, the interaction associated with a corrective action. The process 900 may also include causing the first device to display a representation of the corrective action in association with the template.

Additionally, or alternatively, the process 900 may include storing first data indicating prior degrees of movement deviation associated with the interactive template and storing second data indicating prior degrees of shape deviation association with the item to be created. The process 900 may also include selecting, from an index of corrective actions associated with the first data and the second data and based at least in part on the first degree and the second degree, a corrective action for creating the item. In these examples, causing the action to be performed may include causing display of the corrective action in association with the first device.

Additionally, or alternatively, the process 900 may include determining, based at least in part on the computer vision processing, a shape of the item once created from the object and identifying a reference shape of the item. The process 900 may also include generating, based at least in part on differences between the shape of the item and the references shape of the item, first data that correlates portions of the item as created from the object with portions of the reference shape of the item. The process 900 may also include causing display of content in association with the item utilizing the first data, the content displayed in association with the item as if the content were displayed for the reference shape of the item.

Additionally, or alternatively, the process 900 may include establishing a communications session between the first device and a second device that is remote from the first device. The process 900 may also include causing display, on the second device and during the communications session, of images captured by the camera of the first device. The process 900 may also include causing display, on the second device and during the communications session, of the template as projected by the projector of the first device. The process 900 may also include determining a degree of progression of the steps for creating the item from the object. The process 900 may also include causing display, on the second device and based at least in part on the degree of progression, of recommended actions for a user of the second device to take to assist in creation of the item from the object.

Additionally, or alternatively, the process 900 may include storing first data indicating prior degrees of shape deviation association with the item to be created. The process 900 may also include selecting, from an index of corrective actions associated with the first data and based at least in part on the second degree, a subset of corrective actions for creating the item. The process 900 may also include causing display, on a second device that is remote from the first device, of a representation of the subset of corrective actions. The process 900 may also include receiving user input data from the second device selecting a corrective action from the subset of corrective actions. The process 900 may also include causing display, on the first device, of a representation of the corrective action as selected on the second device.

Additionally, or alternatively, the process 900 may include receiving an indication that the item has been created from the object and causing the first device to display a visual element including a perimeter within which the item is to be placed. The process 900 may also include determining that the item has been placed on the surface at a location that corresponds to where the visual element is displayed. The process 900 may also include determining, utilizing computer vision processing performed on image data of the location, a shape of the item as created from the object. The process 900 may also include associating an identifier of the item with the shape of the item, the identifier indicating a type of the item. The process 900 may also include determining that the item has been placed on the surface based at least in part on detecting the shape of the item. The process 900 may also include causing display of content associated with the item based at least in part on the type of the item.

Additionally, or alternatively, the process 900 may include determining that the object has been placed on the surface and determining a first location of the object in association with the surface. The process 900 may also include selecting the first location to cause display of the template based at least in part on the object being located at the first location. The process 900 may also include selecting a second location to cause display of directions for creating the item from the object, the second location differing from the first location such that the template and the directions, as displayed, are associated with separate portions of the surface.

Figure 10:
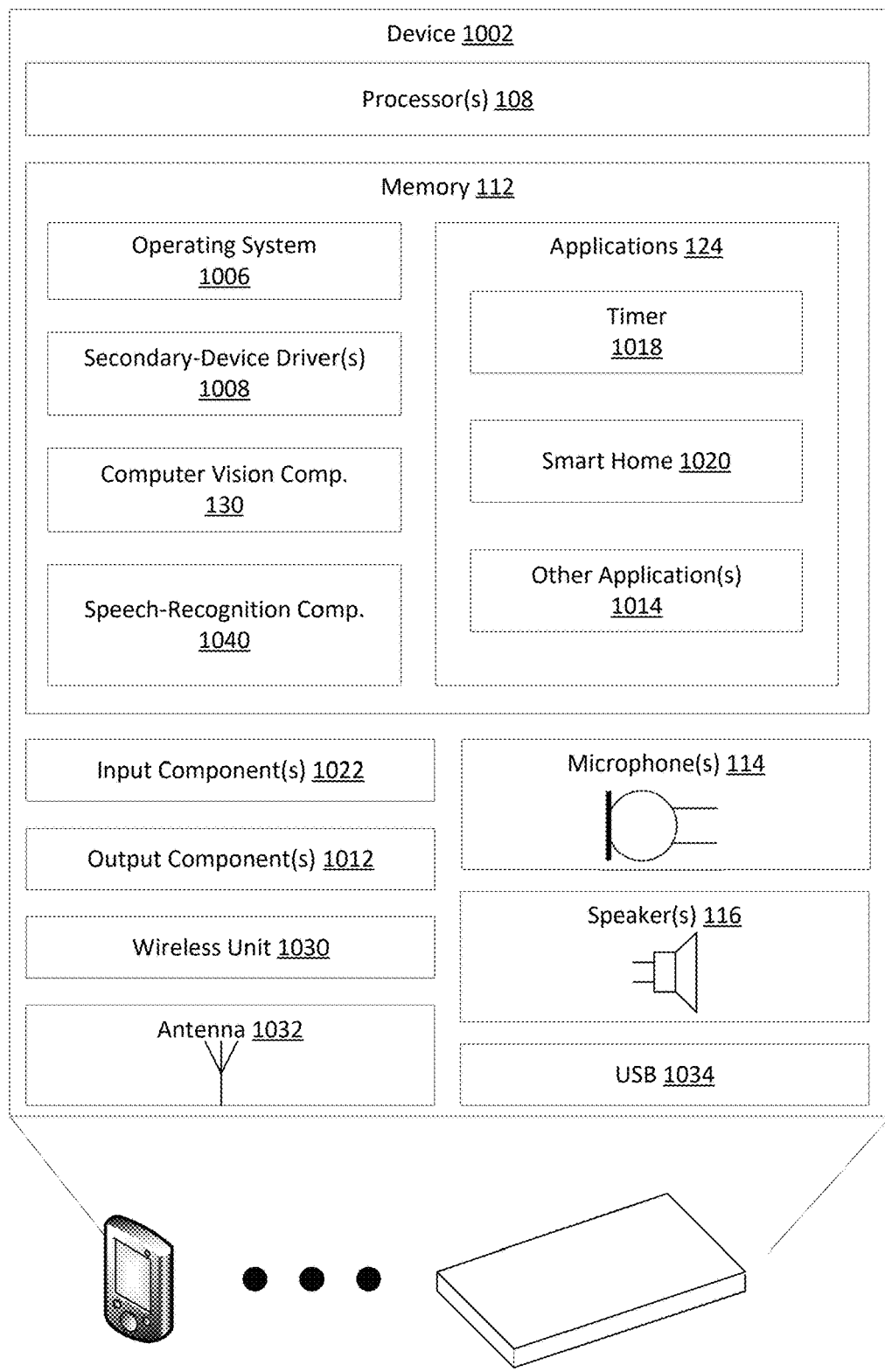
FIG. 10 illustrates a conceptual diagram of components of an example device that may be utilized in association with computer-guided item creation and interaction.

FIG. 10 illustrates a conceptual diagram of components of an example device on which capacitive field tuning for detecting touches on objects may be performed. The device 1002 may be implemented as a standalone device that is relatively simple in terms of functional capabilities with limited input/output components, memory, and processing capabilities. For instance, the device 1002 may not have a display (other than simple lights, for instance). The device 1002 may be implemented with the ability to receive and output audio, a network interface (wireless or wire-based), power, and processing/memory capabilities. In certain implementations, a set of one or more input components may be employed (e.g., a dedicated button to initiate a configuration, power on/off, etc.). Nonetheless, a mode of user interaction with the device 1002 may be through voice input and audible output.

The device 1002 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 1002 may also include configuration as a personal computer, a rubber mat or a mat made of another material, etc. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input and to receive touch input on a touch-sensitive surface.

In the illustrated implementation, the device 1002 includes one or more processors 108 and memory 112. In some implementations, the processors(s) 108 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 may possess its own local memory, which also may store program components, program data, and/or one or more operating systems. The memory 112 may include components described with respect to FIG. 1.

Several components such as instruction, datastores, and so forth may be stored within the memory 112 and configured to execute on the processor(s) 108. A few example functional components are shown as applications stored in the memory 112 and executed on the processor(s) 108, although the same functionality may alternatively be implemented in hardware, firmware, or as a system on a chip (SOC). At least some of the components shown in FIG. 1 may also be stored in the memory 112 and executable by the processor(s) 108 to implement the functionality described herein.

An operating system component 1006 may be configured to manage hardware within and coupled to the device 1002 for the benefit of other components. In addition, in some instances the device 1002 may include some or all of one or more secondary-device drivers 1008. In other instances, meanwhile, the device 1002 may be free from the drivers 1008 for interacting with second devices. The device 1002 may further including, in some instances, a speech-recognition component 1040, which may correspond to the on-device speech processing described with reference to FIG. 1. Additionally, the memory 112 may include a computer vision component 130, which may be the same as or similar to the computer vision component 130 described with respect to FIG. 1. With respect to the functionality of the computer vision component 130, the functionality may be the same or similar to the functionality described above, including in FIG. 1, with respect to the computer vision component 130.

The device 1002 may also include a plurality of applications 124 stored in the memory 112 or otherwise accessible to the device 1002. In this implementation, the applications 124 may include a gaming application, an educational application, a timer 1018, a smart home application 1020, and/or one or more other applications 1014. However, the device 1002 may include any number or type of applications and is not limited to the specific examples shown here. The gaming application may be configured to initiate and play one or more games utilizing the device 1002. The educational application may be configured to initiate and run one or more educational programs. The timer 1018 may be configured to provide the functions of a simple timing device and clock. The smart home application 1020 may be configured to assist in controlling smart devices. When implementing "hybrid" functionality where a system 104 is unavailable to the device 1002 and/or when the device 1002 is configured to respond to intents without aid from the system 104, these applications 124 may be configured to access on-device resources (e.g., on-device game and application libraries, an on-device shopping list, an on-device calendar, etc.). In some cases, changes made to these on-device resources may be synched with off-device versions of those resources when the system 104 subsequently becomes available to the device 1002.

Generally, the device 1002 has input components 1022 and output components 1012. The input components 1022 may include, without limitation, a keyboard, keypad, mouse, touch screen, joystick, control buttons, etc. In some implementations, one or more microphones 114, which may be similar to the microphone(s) 114 of FIG. 1 and may function as input components 1022 to receive audio input, such as user voice input. The output components 1012 may be similar to the output component(s) of FIG. 1, and may include, without limitation, a display(s), a light element (e.g., LED), a vibrator to create haptic sensations, or the like. In some implementations, one or more speakers 116 may function as output components 1012 to output audio sounds (e.g., audio content, TTS responses, tones at various frequencies, etc.).

A user may interact with the device 1002 by speaking to it, and the one or more microphone(s) 114 captures the user's speech. The device 1002 can communicate back to the user by emitting audible statements through the speaker 116. In this manner, the user can interact with the device 1002 solely through speech, without use of a keyboard or display.

The device 1002 may further include a wireless unit 1030 coupled to an antenna 1032 to facilitate a wireless connection to a network. The wireless unit 1030 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 108. As such, the device 1002 may be configured to act as a hub that can communicate with second devices in the environment and control the second devices, such as by using protocol stacks, drivers, and adapters to communicate over a suitable communications protocol. A USB port 1034 may further be provided as part of the device 1002 to facilitate a wired connection to a network, or a plug-in network device that communicates with other wireless networks. In addition to the USB port 1034, or as an alternative thereto, other forms of wired connections may be employed, such as a broadband connection, Transmission Control Protocol/Internet Protocol (TCP/IP) protocol connection, etc.

Figure 11:
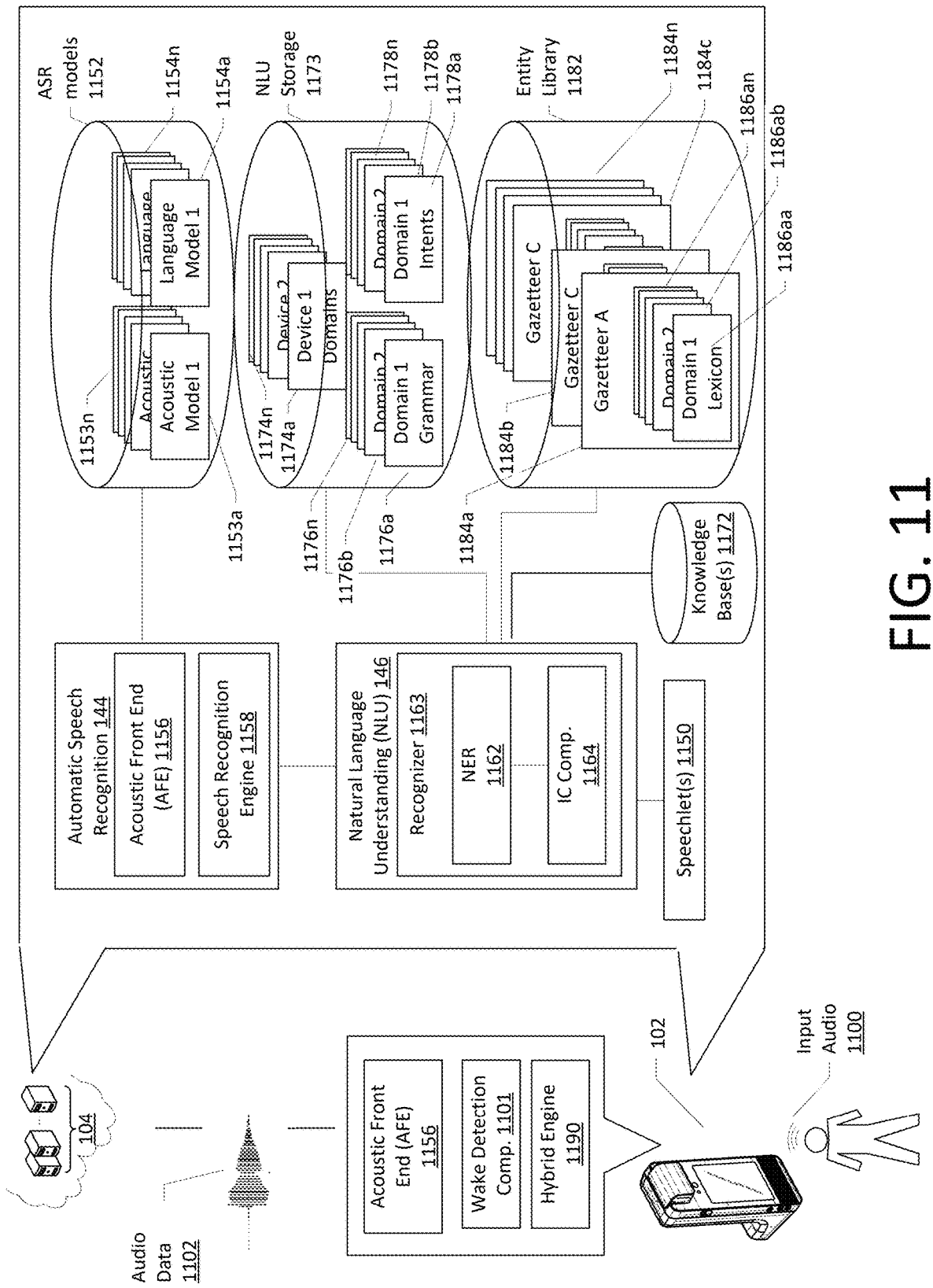
FIG. 11 illustrates a conceptual diagram of components of a speech-processing system for processing audio data provided by one or more devices, including for computer-guided item creation and interaction.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone 114 of the device 102, or another device, captures audio 1100 corresponding to a spoken utterance. The device 102, using a wake word engine 1101, then processes audio data corresponding to the audio 1100 to determine if a keyword (such as a wakeword) is detected in the audio data. Following detection of a wakeword, the device 102 processes audio data 1102 corresponding to the utterance utilizing an ASR component 144. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 144.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102 may "wake." The audio data 1102 may include data corresponding to the wakeword. Further, a device may "wake" upon detection of speech/spoken audio above a threshold, as described herein. An ASR component 144 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data. As described in more detail herein, the device 102 may include a hybrid engine 1190, which may perform some or all of the speech processing described herein and/or may arbitrate between speech processing results determined on the device 102 and those received from other devices and/or the system 104. In these examples, at least a portion of the speech processing described with respect to the system 104 may be performed by the device 102.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, let's build a paper airplane?" The wake detection component may identify the wake word, otherwise described as a trigger expression, "Alexa," in the user utterance and may "wake" based on identifying the wake word. The speech recognition engine 1158 may identify, determine, and/or generate text data corresponding to the user utterance, here "let's build a paper airplane."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 146 may include various components, including potentially dedicated processor(s), memory, storage, etc. As shown in FIG. 11, an NLU component 146 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184a-1184n) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 1100) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 144 and outputs the text "let us build a paper airplane" the NLU process may determine that the user intended to initiate an application for guiding a user through building a paper airplane.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "build a paper airplane," "build" may be tagged as a command (to initiate a computer-guided application for creating items) and "paper airplane" may be tagged as the naming identifier of the item to be created.

To correctly perform NLU processing of speech input, an NLU process 146 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 146 may begin by identifying potential domains that may relate to the received query. The NLU storage 1173 includes a database of devices (1174a-1174n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184a) includes domain-index lexical information 1186aa to 1186an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178a-1178n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1150. The speechlet 1150 may be determined based on the NLU output. For example, if the NLU output includes a command to send a message, the speechlet 1150 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1150 may provide some or all of this information to a text-to-speech (TTS) engine. The TTS engine may then generate an actual audio file for outputting the audio data determined by the application (e.g., "okay," or "a template for building the paper airplane has been displayed").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 12:
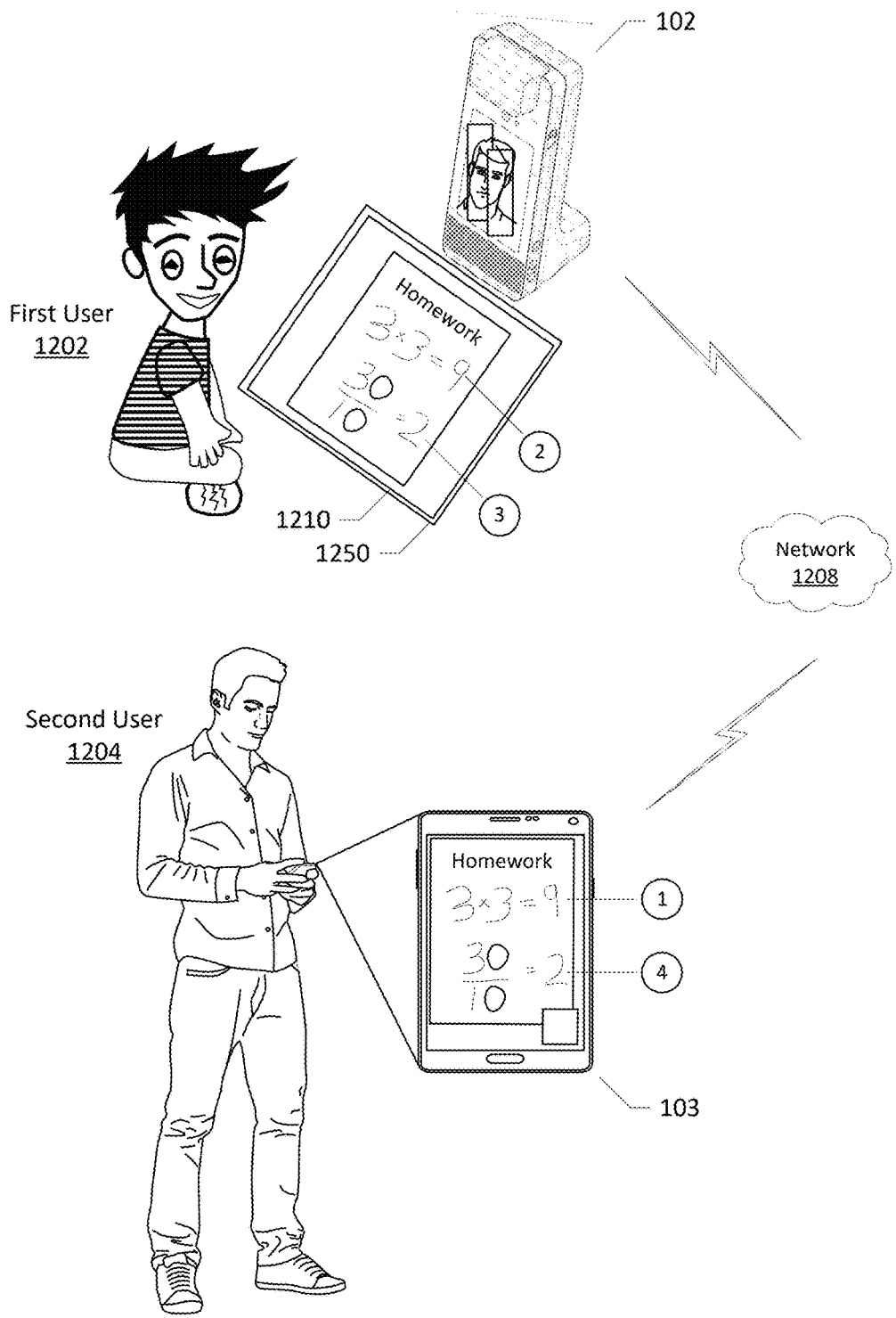
FIG. 12 illustrates an example environment for utilizing a user device to interact with a remote device, according to an embodiment of the present disclosure.

FIG. 12 illustrates an example environment for using the electronic device 102 to interact among users. For example, a first user 1202 is shown interacting with the electronic device 102 to communicate with a second user 1204, who interacts with a remote device 103. Although the remote device 103 is illustrated as a mobile device, such as a phone, the remote device 103 may include a tablet, laptop, another electronic device, and so forth. The first user 1202 may be located in a first location and the second user 1204 may be located in a second location that is remote from the first location. The electronic device 102 and the remote device 103 are shown being in communication via a network 1208, such as the Internet. In doing so, the electronic device 102 may send and receive information to and from the remote device 103, enabling interactivity between the first user 1202 and the second user 1204.

The electronic device 102 and the remote device 103 may provide an immersive and interactive experience for the first user 1202 and the second user 1204. For example, the electronic device 102 is shown including a shared space 1210 through which the first user 1202 and the second user 1204 may interact. As illustrated, the first user 1202 may place a piece of homework within the shared space 1210. A camera of the electronic device 102 may capture images and generate image data corresponding to the piece of homework. The camera may be oriented downward, towards a bottom of the electronic device 102, or towards the device 102, for observing content within the shared space 1210. The electronic device 102 may then transmit the image data to the remote device 103 for output. For example, as illustrated, the piece of homework may be output on a display (e.g., screen) of the remote device 103.

The electronic device 102 may further include microphones for capturing speech of the first user 1202 and loudspeakers for outputting audio associated with the second user 1204.

The electronic device 102 may further include a camera for capturing images and generating image data of the first user 1202. The camera may be oriented towards a front of the electronic device 102 for capturing images of the first user 1202. This image data may then be transmitted to the remote device 103 for output. For example, the remote device 103, in addition to displaying the piece of homework, may include a portion for outputting the image of the first user 1202. Likewise, the electronic device 102 may output image data depicting the second user 1204 on the display. Presenting image data of the second user 1204 may increase the immersive experience between the first user 1202 and the second user 1204.

To sense interactions within the shared space 1210, the electronic device 102 may include an emitter and a sensor. The emitter may broadcast a plane of light across the shared space 1210 for sensing inputs of the first user 1202. The sensor may detect the touch or interactions through the scattering of IR light as the first user 1202 breaks, or crosses, the plane of light. That is, as the first user 1202 works on the piece of homework, the location of the input may be sensed by the sensor detecting the scattering of light. In turn, the electronic device 102 may transmit data to the remote device 103. Additionally, the use of capacitive sensing, and particularly the detection of touch on objects placed in the shared space 1210 may be performed as described herein.

The second user 1204 may monitor the progress of the first user 1202 at the remote device 103. That is, the second user 1204 may interact with the first user 1202 by interacting with the remote device 103 and such interactions may be presented by the electronic device 102, within the shared space 1210. For example, at "1" the second user 1204 may assist the first user 1202 in solving the math problem "3×3" by entering "9." This input (e.g., touch input) may be sensed by the remote device 1206 and transmitted to the electronic device 102 for output. For example, at "2" the electronic device 102 may display the answer "9" on the piece of homework to indicate the action by the second user 1204. The electronic device 102 may present the answer "9" by projecting content via a projector. As part of this interaction the first user 1202 and the second user 1204 may engage in other forms of interaction, such as speech and video.

Similarly, the first user 1202 may interact within the shared space 1210, attempting to solve the math problem "30/10." For example, at "3" the first user 1202 may enter answer of "2." In some instances, the first user 1202 may provide the answer "2" using a pencil, for example, by drawing on the piece of homework, and/or may provide touch input to the device 102. The camera may capture this input by first user 1202 and transmit associated image data to the remote device 103. Moreover, the sensor of the electronic device 102 may determine a location associated with the touch input through detecting scattering light emitted by the emitter. The electronic device 102 may capture motions associated with the first user 1202 within the shared space 1210 for transmitting to the remote device 103. Capacitive touch sensing, including on objects, may also be performed to detect touches and determine touch locations. In turn, at "4" the remote device 103 may display the answer as answered by the first user 1202. However, given that the answer "2" is incorrect, the second user 1204 may interact with the first user 1202 for correcting the mistake. For example, the second user 1204 may provide assistance by drawing on the remote device 103, verbally explaining the correct answer, and so forth.

In some instances, the electronic device 102 may be used along with a device 1250 that is placed on a surface on which the electronic device 102 resides. For example, certain surfaces may be difficult to project image(s) onto (e.g., uneven surfaces, wood grain, etc.). In these instances, content presented by the projector may become skewed or distorted. The device 1250 may provide an even surface for projecting content. In some instances, the device 1250 may be sized according to the shared space 1210, or may be sized slightly larger than the shared space 1210. For example, the device 1250 may include a width between approximately 15 inches and 25 inches (X-direction), and a length between approximately 10 inches and 15 inches. In some instances, the device 1250 may include materials with reflective surface(s) to reflect light diffusely. In these instances, the material of the device 1250 may reflect incident light at many angles (i.e., diffuse reflection), rather than at just one angle (i.e., specular reflection). This may increase a viewing experience of users interacting with the electronic device 102 and the device 1250. For example, diffuse reflection may allow users to view a bright, vivid image of content projected by the projector. Comparatively, materials or finishes with specular reflection may result in perceived glares by the user.

The material of the device 1250 may include, but is not limited to, polymers, foams, rubber, composites, etc. Additionally, materials may be surface treated to be reflective and/or with certain colors to display projected content (e.g., white). For example, a surface of the device 1250 may include a low coefficient of friction for reducing drag, stickiness, or pull during swiping actions by the first user 1202. The device 1250 may be compact and/or easily stored when not in use (e.g., folded, rolled, etc.). The device 1250 may also include indents, cutouts, or other features for aligning the device 1250 with the electronic device 102.

Accordingly, FIG. 12 illustrates a scenario in which the electronic device 102 and the remote device 103 may mirror inputs provided by the first user 1202 and the second user 1204, respectively, to facilitate interactions between remote locations.

Figure 13:
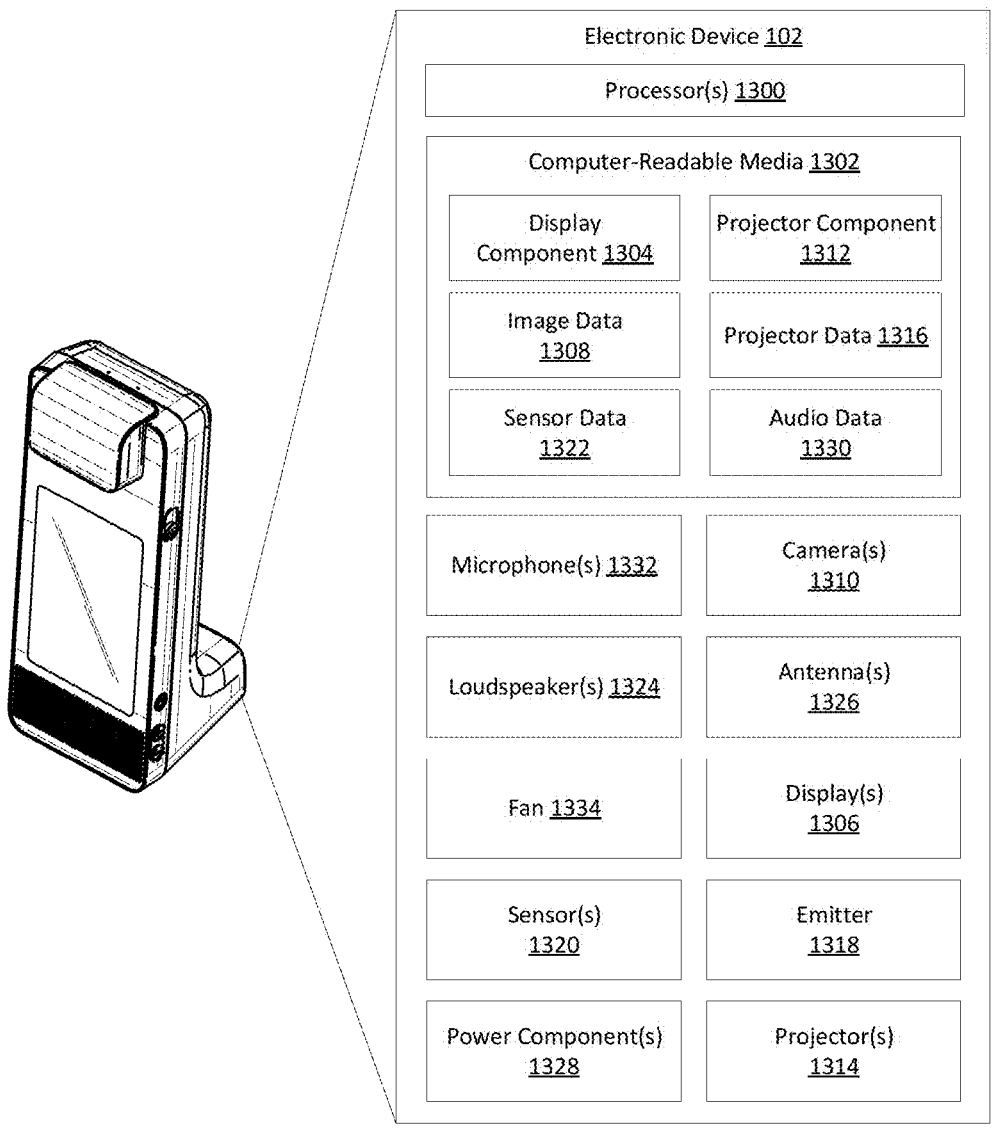
FIG. 13 illustrates example computing components of a user device according to an embodiment of the present disclosure.

FIG. 13 illustrates example computing components of the electronic device 102. The electronic device 102 may include one or more processor(s) 1300 and computer-readable media 1302. Several components such as instructions, data stores, and so forth can be stored within the computer-readable media 1302 and be configured to execute on the processor(s) 1300. A few example functional components are shown as applications stored in the computer-readable media 1302 and executed on the processor(s) 1300, although the same functionality can alternatively be implemented in hardware, firmware, or as a system on a chip (SOC).

A display component 1304 is configured to control one or more display(s) 1306 of the electronic device 102. For example, the electronic device 102 may receive image data 1308 representing image(s) and/or video(s) received from remote device(s) (e.g., tablet, mobile phone, laptop, etc.). The display component 1304 may cause the display(s) 1306 to output the image data 1308 on the display, for viewing by user(s) of the electronic device 102. In some instances, the display(s) 1306 may include high-resolution displays, e-ink displays, tactile electronic displays (e.g., refreshable Braille displays), segment displays, LED displays, LCDs, laser displays, holographic displays, and the like. Additionally, the display(s) 1306 may be touch-sensitive and capable of receiving touch input from the user(s). For example, the display(s) 1306 may include one or more touch screens and/or capacitive sensing.

The image data 1308 may also correspond to image(s) and/or video(s) captured by camera(s) 1310 of the electronic device 102. For example, the electronic device 102 may include a first camera for capturing image(s) and/or video(s) of the user(s) of the electronic device 102. Image(s) and/or video(s) captured by the first camera may be transmitted to the remote device(s) to provide an immersive experience between user(s) of the electronic device 102 and user(s) of remote device(s). Additionally, the electronic device 102 may include a second camera for capturing content presented by the user(s) of the electronic device 102 within a shared space. The shared space may represent an area in front of the electronic device 102 whereby the user(s) may provide content or materials (e.g., homework, drawing, book, etc.) for interacting with the user(s) of the remote device(s). Within this shared space, the second camera may capture content presented or shared by the user(s) of the electronic device 102. By way of example, if the user(s) present a piece of homework, the second camera may capture image data 1308 associated with the homework and transmit the image data 1308 to the remote device(s) for viewing. In some instances, the camera(s) 1310 may include a high-resolution camera, a depth sensor, IR sensor, RGB camera, and/or other imagining devices and/or sensors.

A projector component 1312 is configured to control one or more projectors 1314 of the electronic device 102. For example, the electronic device 102 may receive projector data 1316 representing content received from remote device(s). The content may correspond to interactions made by user(s) of the remote device(s). For example, the user(s) of the remote device(s) may interact with first user(s) of the electronic device 102. By way of illustration, if the user(s) of the electronic device 102 and the user(s) of the remote device are working on homework, the user(s) of the remote device may provide interactions associated with solving a math problem. The remote device(s) may capture these interactions, and the projector component 1312 may output content associated with these interactions (i.e., the projector data 1316). Moreover, this projected content may be overlaid or presented on top of material (e.g., homework) within the shared space. As such, the projector component 1312 may receive projector data 1316 for being projected by the projector.

To sense interactions made by the user(s) of the electronic device 102, the electronic device 102 may include an emitter 1318 and sensor(s) 1320. The emitter 1318 may output a plane of light in front of the electronic device 102, within the shared space. The plane of light is invisible to the user(s) and may run parallel to a surface on which the electronic device 102 resides. As the user(s) interacts within the shared space, the sensor(s) 1320 may detect scattering of the light to determine a position of the interaction. These inputs are captured by the sensor(s) 1320, which generate sensor data 1322. In some instances, the sensor data 1322 may indicate a location of the inputs within the spared space for use in portraying the touch inputs to the user(s) of the remote device(s). For example, continuing with the above example, if the user(s) of the electronic device 102 point to a particular math problem, the sensor(s) 1320 may detect the reflected light for determining a position of the interaction. The electronic device 102 may then transmit these interactions, as well as the images and/or video captured by the camera(s) 1310, to the remote device(s) for output.

The electronic device 102 is further shown including one or more microphone(s) 1332, one or more speaker(s) 1324, one or more antenna(s) 1326, and/or one or more power components 1328. In some implementations, the one or more microphone(s) 1332 may function as input components to receive audio input, such as user voice input. For example, the user(s) of the electronic device 102 may interact with the user(s) of the remote device through speech, and the one or more microphone(s) 1332 capture the speech. The electronic device 102 may output speech of the user(s) of the remote device (i.e., audio) to the user(s) of the electronic device 102 through the one or more speaker(s) 1324. For example, the electronic device 102 may receive audio data 1330 from the remote device(s) for outputting audio via the speaker(s) 1324. Additionally, the audio data 1330 may represent audio of the user(s) of the electronic device 102 captured by the one or more microphone(s) 1332.

In some instances, the one or more antenna(s) 1326 are configured to send and/or receive wireless signals for communicating with other devices, such as the remote device(s). In some instances, the one or more antenna(s) 1326 may operate in conjunction with one or more wireless units to implement one or more of various wireless technologies, such as Wi-Fi, Bluetooth, RF, cellular, satellite, NFC (near-field communication), RFID (radio frequency identification), and so on. In some instances, the one or more antenna(s) 1326 may be used to communicate wirelessly with one or more remote device(s) via a network such as the internet. In some instances, the electronic device 102 may communicate in a mesh network (e.g., directly between remote device(s)) and/or via an access point.

In some instances, the one or more power components 1328 provide electrical power to the electronic device 102. In some instances, the power components 1328 may include one or more batteries, capacitors, inductors, chargers, ports, etc. to receive and store power. In some instances, the power components 1328 may include contact charging or inductive charging systems to receive power from a variety of mechanisms. In some instances, the one or more power components 1328 may include a port to receive mains power.

A fan 1334 is further included to dissipate head generated by components of the electronic device 102. The fan 1334, for example, may operate to intake air, circulate air within an interior of the electronic device 102, and vent the heated air out of the electronic device 102.

The electronic device 102 may further include, in some instances, a speech-recognition component that employs any number of conventional speech processing techniques such as use of speech recognition, natural-language understanding, and extensive lexicons to interpret voice input. In some instances, the speech-recognition component may simply be programmed to identify the user uttering a predefined word or phrase (e.g., a "wake word"), after which the electronic device 102 may begin uploading data to a network device for more robust speech-recognition processing. In other examples, the electronic device 102 itself may, for example, identify voice commands from user(s) and provide indications of these commands to the network device. The electronic device 102 may also include a plurality of applications or games stored in the computer-readable media 1302 or otherwise accessible to the electronic device 102.

Figure 14A:
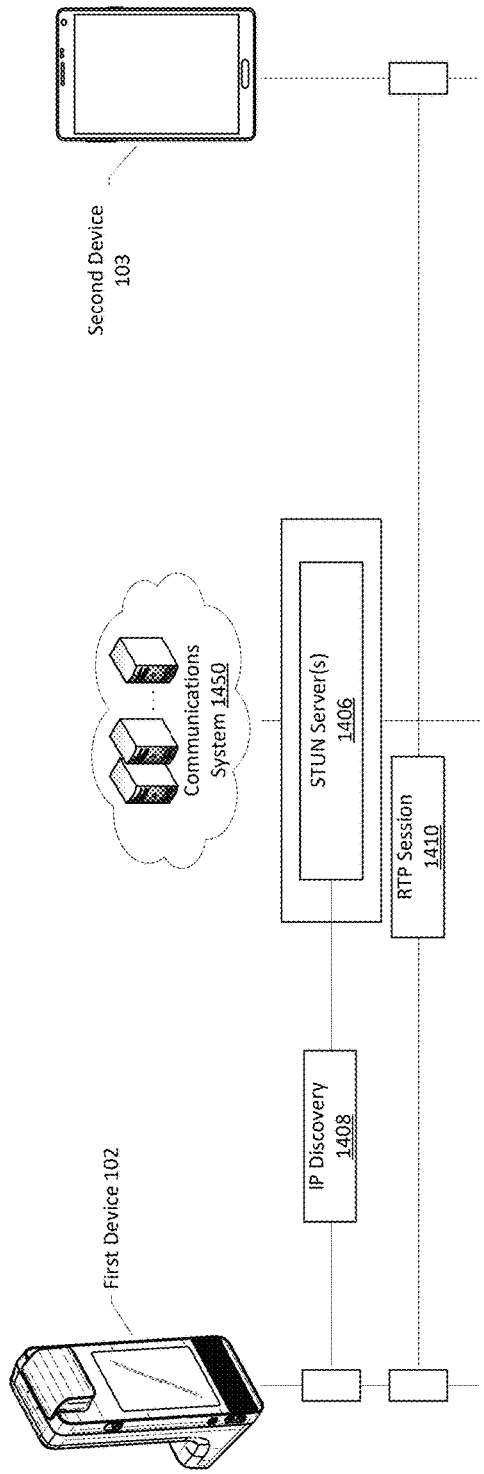
FIGS. 14A and 14B illustrate example components for establishing a flow of data between devices.
Figure 14B:
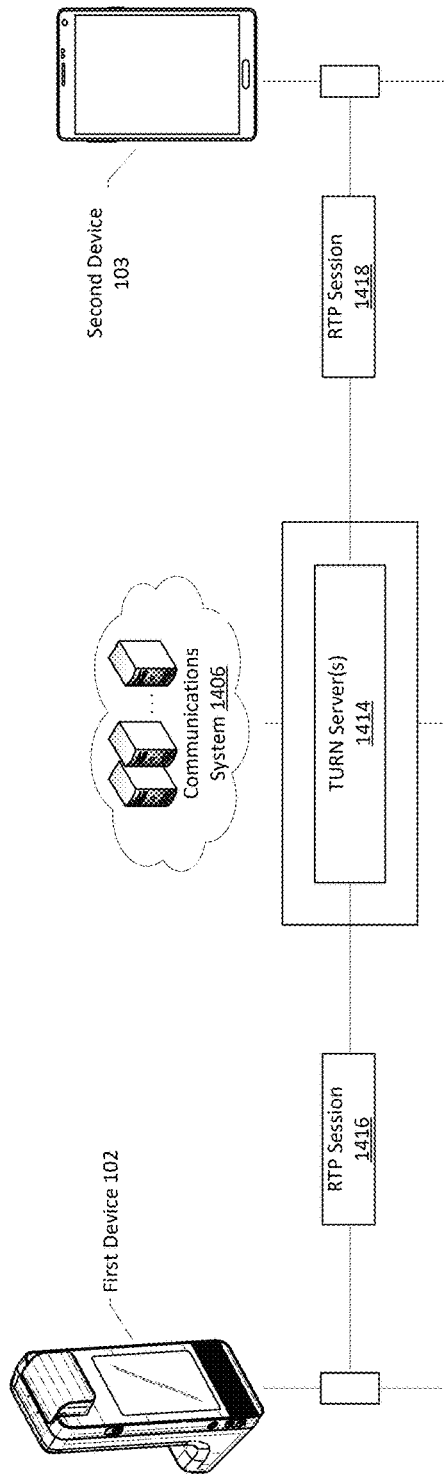

FIGS. 14A and 14B illustrate example components for establishing a flow of data between devices. For instances, FIGS. 14A and 14B illustrate examples of establishing media streams between devices according to the present disclosure. In examples, the first device 102 may have a publicly accessible IP address and may be configured to establish the RTP communication session directly with the second device 103. To enable the first device 102 to establish the RTP communication session, the communications system 1450 may include Session Traversal of User Datagram Protocol (UDP) Through Network Address Translators (NATs) server(s), such as STUN server(s) 1406. The STUN server(s) 1406 may be configured to allow NAT clients, such as a first device 102 behind a firewall, to setup calls to a VoIP provider and/or a messaging provider hosted outside of the local network by providing a public IP address, the type of NAT they are behind, and a port identifier associated by the NAT with a particular local port. As illustrated in FIG. 14A, the first device 102 may perform, at block 1408, IP discovery using the STUN server(s) 1406 and may use this information to set up an RTP communication session 1410, such as a UDP communication, between the first device 102 and the second device 103 to establish a call.

In some examples, the first device 102 may not have a publicly accessible IP address. For example, in some types of NAT the first device 102 cannot route outside of the local network. To enable the first device 102 to establish an RTP communication session, the communications system 1450 may include Traversal Using relays around NAT (TURN) server(s) 1414. The TURN server(s) 1414 may be configured to connect the first device 102 to the second device 103 when the first device 102 is behind a NAT. As illustrated in FIG. 14B, the first device 102 may establish, at block 1416, an RTP session with the TURN server(s) 1414 and the TURN server(s) 1414 may establish, at block 1418, an RTP session with the second device 103. Thus, the first device 102 may communicate with the second device 103 via the TURN server(s) 1414. For example, the first device 102 may send outgoing audio data to the communications system 1450 and the communications system 1450 may send the outgoing audio data to the second device 103. Similarly, the second device 103 may send incoming audio/video data to the communications system 1450 and the communications system 1450 may send the incoming data to the first device 102.

In some examples, the communications system 1450 may establish communication sessions using a combination of the STUN server(s) 1406 and the TURN server(s) 1414. For example, a communication session may be more easily established/configured using the TURN server(s) 1414, but may benefit from latency improvements using the STUN server(s) 1406. Thus, the system may use the STUN server(s) 1406 when the communication session may be routed directly between two devices and may use the TURN server(s) 1414 for all other communication sessions. Additionally, or alternatively, the system may use the STUN server(s) 1406 and/or the TURN server(s) 1414 selectively based on the communication session being established. For example, the system may use the STUN server(s) 1406 when establishing a communication session between two devices (e.g., point-to-point) within a single network (e.g., corporate LAN and/or WLAN), but may use the TURN server(s) 1414 when establishing a communication session between two devices on separate networks and/or three or more devices regardless of network(s). When the communication session goes from only two devices to three or more devices, the system may need to transition from the STUN server(s) 1406 to the TURN server(s) 1414. Thus, if the system anticipates three or more devices being included in the communication session, the communication session may be performed using the TURN server(s) 1414.

Figure 15:
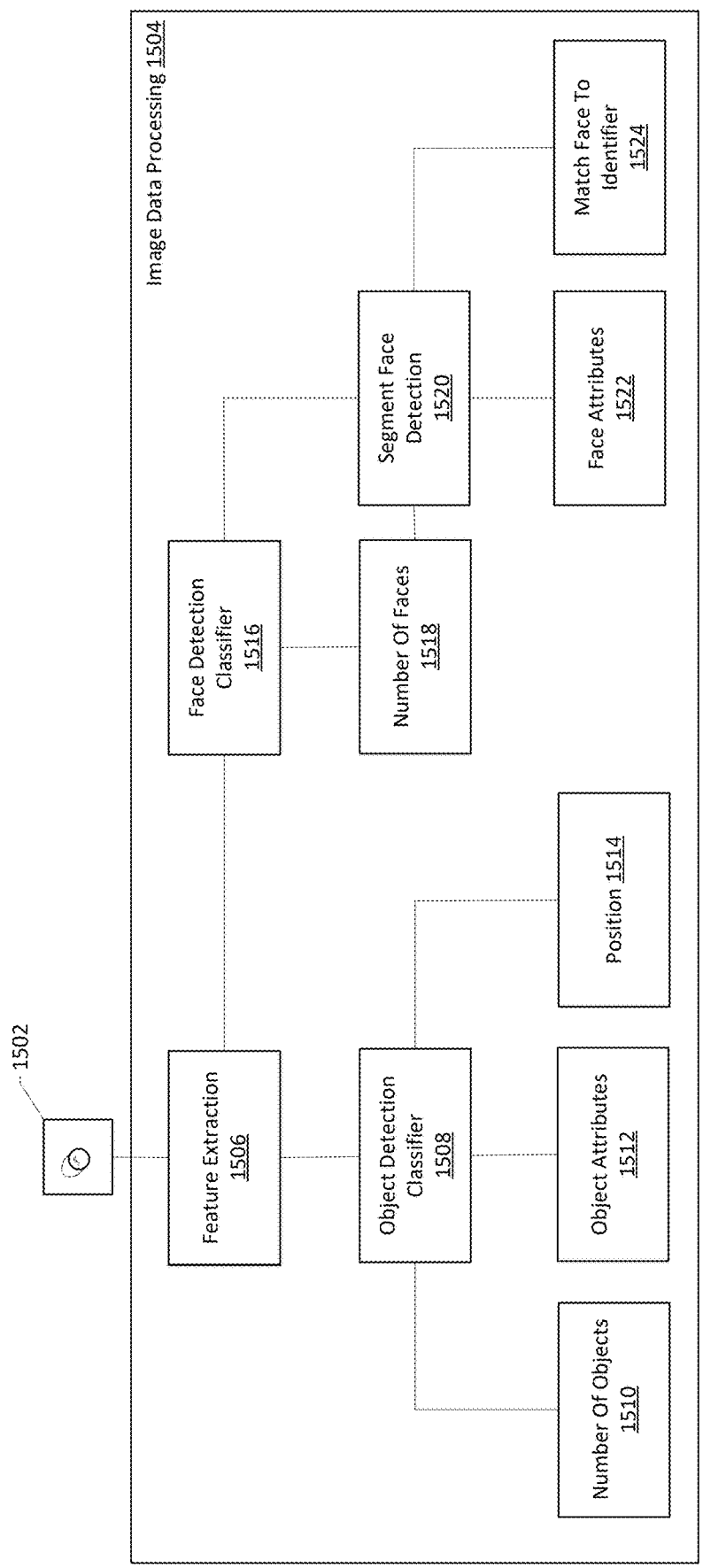
FIG. 15 is a schematic diagram of a process for detecting objects in image data.

FIG. 15 is a schematic diagram of an example process for detecting objects in image data. For example, a camera apparatus 1502 acquires image data for processing using image data processing 1504. In some instances, the image data processing 1504 can be performed by the camera apparatus 1502. In some instances, the image data processing 1504 can be performed by other components. For instance, a system can receive the image data from the camera apparatus 1502, and then perform the image data processing 1504.

To process the image data, the image data processing 1504 can use one or more image processing techniques (e.g., facial recognition, object recognition, etc.) to extract features 1506 from the image data. In some instances, the features can include objects (e.g., guests, robots, etc.) and faces. For instance, the image data processing 1504 can identify each object and face that is within the image data.

For objects, the image data processing 1504 may include an object detection classifier 1508 in order to detect a number of objects 1510 in a field of view, attributes 1512 (e.g., characteristics) associated with each of the objects, and a position 1514 for each of the objects. For instance, the number of objects 1510 can include how many objects are in the field of view. The attributes 1512 associated with each object can include a height of the object, hair color of the object, an approximate weight of the object (e.g., 100 pounds), a body type for the object (e.g., slim, etc.), clothes that the object is wearing, facial recognition of the object, or the like, object shapes, object colors, object thicknesses, etc.

For faces, the image data processing 1504 can apply a face detection classifier 1516 in order to detect a number of faces 1518. Additionally, for each face, the image data processing 1504 can perform segment face detection 1520 in order to determine attributes 1522 (e.g., characteristics) for each of the faces at the environment and detect an identifier 1524 for each of the faces at the environment.

Attributes 1522 for each face can include a relative size, a color, a shape of the face, or the like. An identifier 1524 for a face can include any type of identity, such as a user profile identifier.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to ensure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
  causing a projector of a first device to display:
    an interactive template on a flat surface, the interactive template configured to guide a user through steps for creating an item from an object, the interactive template displayed on a first portion of a flat surface onto which the projector is projecting light; and
    concurrently on the flat surface, directions corresponding to the steps for creating the item, the directions displayed on a second portion of the flat surface;
  receiving real-time image data representing a plurality of images of the object as captured by a camera of the first device over a period of time;
  receiving infrared data representing second images of the object over the period of time;
  determining, utilizing computer vision processing performed on the real-time image data and the infrared data, a first degree to which movement of the object corresponds to the directions for creating the item over the period of time, the first degree indicating a deviation between the movement of the object and reference movements of the object associated with the directions for creating the item;
  determining, utilizing the computer vision processing, a second degree to which a shape of the object corresponds to a reference shape of the object when the object is manipulated pursuant to the directions for creating the item; and
  causing display of the interactive template on the flat surface and the directions concurrently displayed on the flat surface to be altered in response to the first degree and the second degree.

2. The system of claim 1, the operations further comprising:
causing a second device that is remote from the first device to display the first images of the object in relation to the surface;
causing the second device to display, in response to the first degree and the second degree, an indication of how the object as manipulated by the user deviates from the interactive template and the directions;
receiving user input data from the second device, the user input data representing an interaction configured to show the user of the first device a corrective action to be taken to reduce the deviation between the object as manipulated by the user and the reference shape of the object; and
causing the first device to display a representation of the interaction on the first portion of the surface corresponding to the interactive template.

3. The system of claim 1, the operations further comprising:
storing first data indicating prior degrees of movement deviation associated with the interactive template;
storing second data indicating prior degrees of shape deviation association with the item to be created;
determining, by analyzing the first degree in association with the first data and by analyzing the second degree in association with the second data, a classification for how the object as manipulated by the user deviates from the object as correctly manipulated to create the item;
selecting, from an index of corrective actions, a corrective action that is associated with the classification; and
wherein causing display of the interactive template and the directions to be altered includes causing display of the corrective action.

4. The system of claim 1, the operations further comprising:
determining, utilizing the computer vision processing, a shape of the item created from the object;
identifying a reference shape of the item;
determining first data indicating differences between the shape of the item and the reference shape of the item;
generating, utilizing the first data, second data that correlates portions of the item with portions of the reference shape of the item;
determining that the item is within a field of view of the camera of the first device; and
causing display of content in association with the item utilizing the second data to determine where, on the surface, to display the content such that the content is displayed in association with the item as if the content were displayed for the reference shape of the item.

5. A method, comprising:
causing a first device to display a template on a flat surface concurrently with directions, the template and directions configured to guide a user through steps to create an item from an object;
receiving real-time image data representing images of the object as the item is being created, the image data being captured by a camera of the first device over a period of time;
determining, based at least in part on computer vision processing performed on the real-time image data, a first degree to which movement of the object during the period of time deviates from reference movements of the object and associated with directions to create the item according to the steps;
determining, based at least in part on the computer vision processing, a second degree to which a shape of the object deviates from a reference shape of the object for creating the item at a first step of the steps; and
causing, based at least in part on the first degree and the second degree, an action to be performed in association with the template and the directions as displayed by the first device on the flat surface.

6. The method of claim 5, further comprising:
causing a second device that is remote from the first device to display the images of the object;
causing the second device to display an indication of how the object as manipulated deviates from the template;
receiving user input data representing an interaction with a representation of the object as displayed on the second device, the interaction associated with a corrective action; and
causing the first device to display a representation of the corrective action in association with the template.

7. The method of claim 5, further comprising:
storing first data indicating prior degrees of movement deviation associated with the template;
storing second data indicating prior degrees of shape deviation association with the item to be created;
selecting, from an index of corrective actions associated with the first data and the second data and based at least in part on the first degree and the second degree, a corrective action for creating the item; and
wherein causing the action to be performed comprises causing display of the corrective action in association with the first device.

8. The method of claim 5, further comprising:
determining, based at least in part on the computer vision processing, a shape of the item created from the object;
identifying a reference shape of the item;
generating, based at least in part on differences between the shape of the item and the references shape of the item, first data that correlates portions of the item with portions of the reference shape of the item; and
causing display of content in association with the item utilizing the first data, the content displayed in association with the item as if the content were displayed for the reference shape of the item.

9. The method of claim 5, further comprising:
establishing a communications session between the first device and a second device that is remote from the first device;
causing display, on the second device and during the communications session, of images captured by the camera of the first device;
causing display, on the second device and during the communications session, of the template as projected by a projector of the first device;
determining a degree of progression of the steps for creating the item from the object; and
causing display, on the second device and based at least in part on the degree of progression, of recommended actions for a user of the second device to take to assist in creation of the item from the object.

10. The method of claim 5, further comprising:
storing first data indicating prior degrees of shape deviation association with the item to be created;
selecting, from an index of corrective actions associated with the first data and based at least in part on the second degree, a subset of corrective actions for creating the item;
causing display, on a second device that is remote from the first device, of a representation of the subset of corrective actions;
receiving user input data from the second device selecting a corrective action from the subset of corrective actions; and causing display, on the first device, of a representation of the corrective action as selected on the second device.

11. The method of claim 5, further comprising:
receiving an indication that the item has been created from the object;
causing the first device to display a visual element including a perimeter within which the item is to be placed;
determining that the item has been placed at a location of a surface that corresponds to where the visual element is displayed;
determining, utilizing computer vision processing performed on image data of the location, a shape of the item as created from the object;
associating an identifier of the item with the shape of the item, the identifier indicating a type of the item;
determining that the item has been placed on the surface based at least in part on detecting the shape of the item; and
causing display of content associated with the item based at least in part on the type of the item.

12. The method of claim 5, further comprising:
determining that the object has been placed on a surface;
determining a first location of the object in association with the surface;
selecting the first location to cause display of the template based at least in part on the object being located at the first location; and
selecting a second location to cause display of the directions for creating the item, the second location differing from the first location such that the template and the directions, as displayed, are associated with separate portions of the surface.

13. A system, comprising:
one or more processors; and
non-transitory computer-readable media storing computer-executable instructions that, when executed by the one or more processors, cause the one or more processors to perform operations comprising:
causing a first device to display a template on a flat surface concurrently with directions, the template and directions configured to guide a user through steps to create an item from an object;
receiving real-time image data representing images of the object as the item is being created over a period of time, the image data captured by a camera of the first device;
determining, based at least in part on computer vision processing performed on the real-time image data, a first degree to which movement of the object deviates from reference movements to create the item according to the steps over the period of time;
determining, based at least in part on the computer vision processing, a second degree to which a shape of the object deviates from a reference shape of the object for creating the item at a first step of the steps; and
causing, based at least in part on the first degree and the second degree, an action to be performed in association with the template and the directions as displayed by the first device on the flat surface.

14. The system of claim 13, the operations further comprising:
causing a second device that is remote from the first device to display the images of the object;
causing the second device to display an indication of how the object as manipulated deviates from the template;
receiving user input data representing an interaction with a representation of the object as displayed on the second device, the interaction associated with a corrective action; and
causing the first device to display a representation of the interaction in association with the template.

15. The system of claim 13, the operations further comprising:
storing first data indicating prior degrees of movement deviation associated with the template;
storing second data indicating prior degrees of shape deviation association with the item to be created;
selecting, from an index of corrective actions associated with the first data and the second data and based at least in part on the first degree and the second degree, a corrective action for creating the item; and
wherein causing the action to be performed comprises causing display of the corrective action in association with the first device.

16. The system of claim 13, the operations further comprising:
determining, based at least in part on the computer vision processing, a shape of the item created from the object;
identifying a reference shape of the item;
generating, based at least in part on differences between the shape of the item and the references shape of the item, first data that correlates portions of the item with portions of the reference shape of the item; and
causing display of content in association with the item utilizing the first data, the content displayed in association with the item as if the content were displayed for the reference shape of the item.

17. The system of claim 13, the operations further comprising:
establishing a communications session between the first device and a second device that is remote from the first device;
causing display, on the second device, of images captured by the camera of the first device during the communications session;
causing display, on the second device, of the template as projected by a projector of the first device during the communications session;
determining a degree of progression of the steps for creating the item from the object; and
causing display, on the second device and based at least in part on the degree of progression, of recommended actions for a user of the second device to take to assist in creation of the item from the object.

18. The system of claim 13, the operations further comprising:
storing first data indicating prior degrees of movement deviation associated with the template;
storing second data indicating prior degrees of shape deviation association with the item to be created;
selecting, from an index of corrective actions associated with the first data and the second data and based at least in part on the first degree and the second degree, a subset of corrective actions for creating the item;
causing display, on a second device that is remote from the first device, of a representation of the subset of corrective actions;
receiving user input data from the second device selecting a corrective action from the subset of corrective actions; and
causing display, on the first device, of a representation of the corrective action as selected on the second device.

19. The system of claim 13, the operations further comprising:
- receiving an indication that the item has been created from the object;
- causing the first device to display a visual element including a perimeter within which the item is to be placed;
- determining that the item has been placed on at a location of a surface that corresponds to where the visual element is displayed;
- determining, utilizing computer vision processing performed on image data of the location, a shape of the item as created from the object;
- associating an identifier of the item with the shape of the item, the identifier indicating a type of the item;
- determining that the item has been placed on the surface based at least in part on detecting the shape of the item; and
- causing display of content associated with the item based at least in part on the type of the item.

20. The system of claim 13, the operations further comprising:
- determining that the object has been placed on a surface;
- determining a first location of the object in association with the surface;
- selecting the first location to cause display of the template based at least in part on the object being associated with the first location; and
- selecting a second location to cause display of the directions for creating the item from the object, the second location differing from the first location such that the template and the directions, as displayed, are associated with separate portions of the surface.

* * * * *